United States Patent
Liu et al.

(10) Patent No.: US 12,431,155 B2
(45) Date of Patent: Sep. 30, 2025

(54) FRAME-LEVEL PERMUTATION INVARIANT TRAINING FOR SOURCE SEPARATION

(71) Applicants: Dolby Laboratories Licensing Corporation, San Francisco, CA (US); DOLBY INTERNATIONAL AB, Dublin (IE)

(72) Inventors: Xiaoyu Liu, Dublin, CA (US); Jordi Pons Puig, Olot (ES)

(73) Assignees: Dolby Laboratories Licensing Corporation, San Francisco, CA (US); DOLBY INTERNATIONAL AB, Dublin (IE)

( * ) Notice: Subject to any disclaimer, the term of this patent is extended or adjusted under 35 U.S.C. 154(b) by 106 days.

(21) Appl. No.: 18/248,801

(22) PCT Filed: Oct. 13, 2021

(86) PCT No.: PCT/US2021/054737
§ 371 (c)(1),
(2) Date: Apr. 12, 2023

(87) PCT Pub. No.: WO2022/081678
PCT Pub. Date: Apr. 21, 2022

(65) Prior Publication Data
US 2024/0005942 A1  Jan. 4, 2024

Related U.S. Application Data

(60) Provisional application No. 63/126,085, filed on Dec. 16, 2020.

(30) Foreign Application Priority Data

Oct. 15, 2020 (ES) .............................. ES202031039
Jan. 13, 2021 (EP) ..................................... 21151297

(51) Int. Cl.
*G10L 25/00* (2013.01)
*G06F 15/00* (2006.01)
*G10L 21/028* (2013.01)

(52) U.S. Cl.
CPC .................................. *G10L 21/028* (2013.01)

(58) Field of Classification Search
CPC ............ G10L 21/0272; G10L 21/0208; G10L 21/028; G10L 2021/02087; G10L 15/16;
(Continued)

(56) References Cited

U.S. PATENT DOCUMENTS 7,664,643 B2   2/2010   Gopinath
7,983,907 B2   7/2011   Visser
(Continued)

FOREIGN PATENT DOCUMENTS

CN   109313910 A   2/2019
CN   110459240 A   11/2019
WO   2014195132 A1  12/2014

OTHER PUBLICATIONS

Defossez, A. et al."Music Source Separation in the Waveform Domain" HAL Open Science, Apr. 2021, pp. 1-17, 17 pages.
(Continued)

*Primary Examiner* — Michael Ortiz-Sanchez

(57) ABSTRACT

Described is a method of training a deep-learning-based system for sound source separation. The system comprises a separation stage for frame-wise extraction of representations of sound sources from a representation of an audio signal, and a clustering stage for generating, for each frame, a vector indicative of an assignment permutation of extracted frames of representations of sound sources to respective sound sources. The representation of the audio signal is a waveform-based representation. The separation stage is trained using frame-level permutation invariant training.
(Continued)

Further, the clustering stage is trained to generate embedding vectors for the frames of the audio signal that allow to determine estimates of respective assignment permutations between extracted sound signals and labels of sound sources that had been used for the frames. Also described is a method of using the deep-learning-based system for sound source separation.

15 Claims, 12 Drawing Sheets

(58) Field of Classification Search
CPC . G10L 21/0232; G10L 21/0216; G10L 25/84; G10L 25/51; G10L 25/81; G10L 25/30; G10L 19/008; G10L 19/02; G10L 15/22; G10L 25/48; G10L 15/02; H04M 3/568; G06N 3/045; G06N 3/02; G06N 3/044; G06N 3/08; G06N 20/00
See application file for complete search history.

(56) References Cited

U.S. PATENT DOCUMENTS

| | | | |
|---|---|---|---|
| 9,093,078 B2* | 7/2015 | Hacihabiboglu | H04R 3/005 |
| 9,668,066 B1 | 5/2017 | Betts | |
| 9,779,727 B2 | 10/2017 | Yu | |
| 10,249,305 B2 | 4/2019 | Yu | |
| 10,460,727 B2 | 10/2019 | Droppo | |
| 10,699,698 B2 | 6/2020 | Qian | |
| 2007/0083365 A1 | 4/2007 | Shmunk | |
| 2008/0215651 A1* | 9/2008 | Sawada | G10L 21/0272 708/205 |
| 2019/0066713 A1* | 2/2019 | Mesgarani | G10L 25/30 |
| 2019/0139563 A1* | 5/2019 | Chen | G06N 3/044 |
| 2019/0318754 A1* | 10/2019 | Le Roux | G10L 19/02 |
| 2020/0035256 A1* | 1/2020 | Choi | G06N 20/10 |
| 2020/0349954 A1* | 11/2020 | Yoshioka | G10L 21/0208 |
| 2020/0351603 A1* | 11/2020 | Hinthorn | H04R 5/04 |
| 2025/0014584 A1* | 1/2025 | Pia | G10L 19/032 |

OTHER PUBLICATIONS

Gene-Ping Yang et al: "Improved Speech Separation with Time-and-Frequency Cross-domain Joint Embedding and Clustering", arxiv.org, Cornell University Library, 201, Olin Library Cornell University Ithaca, NY, 14853, Apr. 16, 2019, pp. 1-5, 5 pages.

Imran, Ali Shariq, et al "Text-Independent Speaker ID for Automatic Video Lecture Classification Using Deep Learning" ACM International Conference Proceeding Series, Apr. 19, 2019, pp. 175-180, 6 pages.

Kolbaek, M. et al."Multi-talker Speech Separation with Utterance-level Permutation Invariant Training of Deep Recurrent Neural Networks" IEEE, pp. 1-12, 12 pages, Jul. 2017.

Kumar, K. et al "MelGAN: Generative Adversarial Networks for ConditionalWaveform Synthesis" Proc. of the 33rd International Conference on Neural Information Processing Systems, Dec. 2019, pp. 14910-14921, 14 pages.

Liu Yuzhou et al, "Divide and Conquer: A Deep CASA Approach to Talker-Independent Monaural Speaker Separation", IEEE/ACM Transactions on Audio, Speech, and Language Processing, IEEE, USA, vol. 27, No. 12, Dec. 1, 2019 pp. 2092-2102, 11 pages.

Luo, Y. et al "Dual-Path RNN: Efficient Long Sequence Modeling for Time-Domain Single-Channel Speech Separation", Audio and Speech Processing, ICASSP 2020, pp. 1-5 5 Pages.

Luo, Y., et al "Conv-TasNet: Surpassing Ideal Time-Frequency Magnitude Masking for Speech Separation", IEEE/ACM Transactions on Audio, Speech and Language Processing, vol. 27, Issue 8, pp. 1256-1266, published Aug. 2019, 10 pages.

Pascual, S. et al "Learning Problem-agnostic Speech Representations from Multiple Self-supervised Tasks", Universitat Politécnica de Catalunya, 2Mila—Université de Montréal, 3Telefónica Research, 4CIFAR Fellow, 2019, pp. 1-5, 5 pages.

Tzinis, E. et al "Two-Step Sound Source Separation: Training on Learned Latent Targets" IEEE International Conference on Acoustics, Speech and Signal Processing (ICASSP), May 2020, pp. 1-5, 5 pages.

Van Den Oord, A et al "Wavenet: A Generative Model for Raw Audio" Arxiv, Sep. 2016, pp. 1-15, 15 pages.

Wan, L. et al "Generalized End-to-End Loss for Speaker Verification" published at ICASSP 2018, Audio and Speech Processing, pp. 1-5, 5 pages.

Wang Zhong-Qiu et al, "Alternative, Objective Functions for Deep Clustering", 2018 IEEE International Conference on Acoustics, Speech and Signal Processing (ICASSP). IEEE, Apr. 15, 2018, pp. 686-690, 5 pages.

Xiaoyu Liu et al: "On permutation Invariant Training for speech source Separation" arxiv.org, Cornell University Library, 201, Olin Library Cornell University Ithaca, NY, Feb. 9, 2021, pp. 1-5, 5 pages.

Yu, D. et al. "Permutation Invariant Training of Deep Models for Speaker-Independent Multi-Talker Speech Separation" IEEE International Conference on Acoustics, Speech and signal Processing, Jun. 2017, pp. 1-5, 5 pages.

Zeghidour, N. et al "Wavesplit: End-to-End Speech Separation by Speaker Clustering" Audio and Speech Processing, Jul. 2020, pp. 1-10, 10 pages.

\* cited by examiner

FRAME-LEVEL PERMUTATION INVARIANT TRAINING FOR SOURCE SEPARATION

CROSS-REFERENCE TO RELATED APPLICATIONS

This application is a U.S. National Stage of International Application No. PCT/US2021/054737, filed Oct. 13, 2021, which claims priority to European Patent Application No.: 21151297.5, filed Jan. 13, 2021, U.S. Provisional Application No. 63/126,085, filed Dec. 16, 2020 and Spanish Patent Application No. P202031039, filed Oct. 15, 2020, each of which is hereby incorporated by reference in its entirety.

TECHNICAL FIELD

The disclosure relates to the field of audio processing. In particular, the disclosure relates to techniques for source separation (e.g., speaker separation) using deep-learning models or systems, and to frameworks for training deep-learning models or systems for source separation.

BACKGROUND

In the following, reference will be made to speaker, talker, or speech source separation as an example of sound source separation. It is to be understood that the present disclosure is not to be construed as being limited to speaker, talker, or speech source separation, but that it generally relates to any kind of sound source separation.

Speech source separation may be performed in a deep learning (DL) framework. One of the main challenges in such framework is the permutation ambiguity problem, which may prevent unambiguously attribution of frames of extracted speech to one of the speakers. This problem may be addressed by utterance-level permutation invariant training (uPIT) of the deep-learning-based system that performs the speech source separation. However, uPIT is inferior to frame-level permutation invariant training (tPIT) as far as the quality of speech source separation is concerned. Thus, conventionally there is a trade-off between quality of source separation and speaker coherence along sequences of frames.

Thus, there is a need for methods of training deep-learning-based systems for sound source separation (e.g., speech source separation) that achieve improved quality of sound source separation, while still allowing for unambiguous attribution of extracted sound source signals to actual sound sources.

SUMMARY

In view of the above, the present disclosure provides a method of training a deep-learning-based system for sound source separation and a method of sound source separation using a deep-learning-based system, as well as a corresponding apparatus, computer program, and computer-readable storage medium, having the features of the respective independent claims.

According to an aspect of the disclosure, a method of training a deep-learning-based system for sound source separation is provided. Training may mean determining parameters for the deep learning model(s) (e.g., neural networks(s)) that is/are used for implementing the system. Further, training may mean iterative training. The system may include a separation stage for frame-wise extraction of representations of sound sources from a representation of an audio signal. The audio signal may be a mixed signal including a plurality of sound sources (e.g., speakers). The system may further include a clustering stage for generating, for each frame, a vector indicative of an assignment permutation (or permutation assignment) of extracted frames of representations of sound sources to respective sound sources (e.g., to labels or other identifiers of sound sources). The assignment permutation may be indicative of a one-to-one assignment of extracted frames to (labels of) sound sources. The vectors generated by the clustering stage may be said to correspond to embedding vectors. As such, the clustering stage may map the frames of the mixed audio signal to a lower-dimensional space, the so-called embedding space, depending on the assignment permutations that are chosen for the respective frames. The clustering by the clustering stage may be used for resolving the sound source permutation ambiguity. The representation of the audio signal and the representations of the sound sources may be waveform-based representations. The method may include obtaining, as inputs, a representation of a mixed audio signal and representations of at least two reference audio signals. The mixed audio signal and the reference audio signals may be waveform audio signals. The reference audio signals may be or relate to ground truth signals. The representations may be waveform-based representations. The mixed audio signal may include at least two sound sources. The reference audio signals may correspond to respective ones of the sound sources included in the mixed audio signal. The method may further include inputting the representation of the mixed audio signal and the representations of the at least two reference audio signals to the separation stage, and training the separation stage to extract the representations of the sound sources from the representation of the mixed audio signal in such manner that, for each frame, a difference function is minimized. The difference function may be based on differences between frames of extracted representations of sound sources and frames of representations of reference audio signals. For each frame, such assignment permutation of extracted representations of sound sources and representations of reference audio signals may be chosen for minimization that results in the smallest difference function. Thus, the training of the separation stage may be frame-level permutation invariant training (tPIT). The method may further include inputting the representation of the mixed audio signal and, for each frame of the representation of the mixed audio signal, the frames of the extracted representations of the sound source together with an indication of the assignment permutation that had been chosen for the respective frame of the representation of the mixed audio signal to the clustering stage, and training the clustering stage to generate the vectors indicative of the assignment permutation of extracted frames of representations of sound sources to respective sound sources in such manner that a separation between groups of vectors of the frames of the mixed audio signal is maximized. The vectors of the frames may be grouped in accordance with the respective assignment permutations indicated by these vectors. The difference function and the separation criterion may be implementations of loss functions used in the training of the separation stage and the clustering stage, respectively.

Configured as described above, the proposed method can use tPIT for waveform-based audio signals. Using tPIT instead of uPIT allows to achieve higher quality in sound source separation. On the other hand, sound source consistency over sequences of frames, which is typically a problem for tPIT frameworks, can be ensured by providing the clustering stage in addition to the separation stage. In particular, reordering the extracted frame in accordance with the embedding vectors that are generated by the clustering stage at separation time will yield output streams that each include a single sound source only, without swaps of sound sources between output streams.

In some embodiments, the difference function may be indicative of a combined difference (e.g., combination of differences) between frames of extracted representations of sound sources and frames of representations of reference audio signals. The combined difference may include, for each extracted representation of a sound source, a difference between the frame of the extracted representation of the sound source and a respective frame of a representation of a reference audio signal.

In some embodiments, the clustering stage may be trained so that a separation criterion is optimized for each frame of the representation of the mixed audio signal. Therein, the separation criterion may be based on Euclidean distances between vectors and/or groups of vectors. Specifically, the separation criterion may be based on, for a given frame of the representation of the mixed audio signal, Euclidean distances between a vector indicating the assignment permutation for the frame and groups of vectors of other frames of the representation of the mixed audio signal. A distance (e.g., Euclidean distance) between a vector and a group (cluster) of vectors may be defined as the distance between the vector and a centroid (mean) of the group.

Using Euclidean distances for deriving the separation criterion allows to perform the training of the clustering stage in a memory-efficient manner and further enables the training when using waveform-based representations of the mixed audio signal that have a high time resolution.

In some embodiments, optimizing the separation criterion may correspond to maximizing, for a given frame of the representation of the mixed audio signal, $$Prob(e_i \in \text{group } i) = -d(e_i, c_i) - \log \sum_{k=1}^{P} \exp(-d(e_i, c_k))$$

Here $e_i$ is the vector of the given frame, $c_k$ is the centroid of the group of vectors for the k-th assignment permutation, P is the total number of assignment permutations, and $d(\cdot,\cdot)$ is the squared Euclidean distance. The centroid of a group of vectors may be the mean of the group. The squared Euclidean distance may be given by $d(x,y)=w\|x-y\|^2+b$, where w is an optional scaling parameter and b is an optional offset. w and b may be learnable parameters, for example.

In some embodiments, the system may further include a transform stage (transformation stage) for transforming the mixed audio signal to the representation of the mixed audio signal. Therein, the mixed audio signal may be transformed to a signal space that is a waveform-based signal space. In other words, the signal space may not be a frequency-domain signal space. In particular, the signal space may not be based on spectrograms. The signal space may be referred to as a generalized signal space. If the system includes the transform stage, it may also include an inverse transform stage that transforms the extracted representations of sound sources back to the waveform domain, e.g., to waveform audio signals of the extracted audio sources.

Thereby, the present embodiment of the invention allows for implementation of deep-learning-based sound source separation in an end-to-end manner (i.e., waveform-in-waveform-out). Advantageously, the waveform-based representations can include feature space representations tailored to the use case of sound source separation in general, and to speaker separation in particular. Further, encoders and/or decoders (i.e., transform stages and/or inverse transform stages) may be deep-learning-based and may be trained in accordance with specific requirements. This is typically not the case for spectrogram-based representations.

In some embodiments, the system may further include a transform stage for transforming the mixed audio signal to the representation of the mixed audio signal. Specifically, the transforming may involve one of: segmenting the mixed audio signal into a plurality of frames (e.g., short frames) in the time domain, deep-learning-based encoding for projecting the mixed audio signal into a latent feature space optimized for sound source separation, Mel-space encoding, and deep-learning-based problem agnostic speech encoding. If applicable, the transform stage (and/or inverse transform stage) may be trained jointly with the separation stage and/or the clustering stage. As noted, the system may also include an inverse transform stage that transforms the extracted representations of sound sources back to the waveform domain. For the case of Mel-encoding, the inverse transform stage may include or correspond to a MelGAN decoder.

In some embodiments, the representation of the mixed audio signal may relate to a segmentation of the mixed audio signal into waveform frames (e.g., short waveform frames). Then, the separation stage may be trained to determine, for each frame of the mixed audio signal, frames of extracted sound sources from the frame of the mixed audio signal in such manner that a loss function $$\sum_{n=1}^{N} \sum_{l=1}^{L} |est_n(t, l) - ref_{\Pi_k(n)}(t, l)|$$

is minimized. Here, t indicates the frame, l denotes the sample number within the frame, L is the total number of samples within the frame, n indicates the label of the extracted sound source, N is the total number of extracted sound sources, est denotes a frame of an extracted sound source, ref denotes a frame of a reference audio signal, and $\Pi_k(n)$ is a permutation mapping for labels n=1, ..., N and indicates the label of the reference audio signal. For each frame, that permutation mapping $\Pi_k$ may be chosen that yields the smallest loss function, and the resulting loss function may be minimized. For each possible permutation of labels n=1, ..., N there may be one corresponding permutation mapping $\Pi_k$. Since for N labels the number of possible permutations is N!, there may be N! permutation mappings, i.e., index k may run from 1 to N!.

For example, the total number of samples within a frame L is in the range of 2-16 samples. At a typical sampling rate of 8000 Hz, a frame of 2-16 samples corresponds to a duration of 0.25-2 ms. However, the present disclosure is not limited to a sampling rate of 8000 Hz, and other sampling rates, such as 44.1 kHz or 48 kHz, may be employed. For such sampling rates, L may also be chosen to correspond to 2-16 samples. Alternatively, L may be chosen such that a frame corresponds to a duration of 0.25-2 ms, e.g. 11-88 samples per frame for a sampling rate of 44.1 kHz or 12-96 samples per frame for a sampling rate of 48 kHz.

Segmentation into (short) time frames corresponds to a particularly simple waveform-based representation. Even though this representation may result in a comparatively high time resolution, the proposed methods enable training of the clustering stage of the deep-learning-based system in a memory-efficient manner.

In some embodiments, the representation of the mixed audio signal may relate to a latent feature space representation of the mixed audio signal generatable by a pre-trained deep-learning-based encoder. Then, the separation stage may be trained to determine, for each frame of the mixed audio signal, frames of extracted sound sources from the frame of the mixed audio signal in such manner that a loss function $$\sum_{n=1}^{N}\sum_{f}|\hat{V}_n(t,f) - V_{\Pi_k(n)}(t,f)|$$

is minimized. Here, t indicates the frame, f denotes the feature within the latent feature space, n indicates the label of the extracted sound source, N is the total number of extracted sound sources, $\hat{V}$ denotes a frame of a representation of the extracted sound source, V denotes a frame of a representation of the reference audio signal, and $\Pi_k(n)$ is a permutation mapping for labels n=1, ..., N and indicates the label of the reference audio signal. The representations of the reference audio signals may be determined based on the representation of the mixed audio signal and a set of masks, wherein the set of masks has been determined in the process of pretraining the deep-learning-based encoder, based on the reference audio signals. For each frame, that permutation mapping $\Pi_k$ may be chosen that yields the smallest loss function, and the resulting loss function may be minimized.

Waveform-based latent-feature space representations may be specifically trained for sound source separation (e.g., speaker separation) and thus may allow for accurate and efficient sound source separation. The proposed methods allow for training of the deep-learning-based system in such frameworks in a memory-efficient manner.

In some embodiments, the method may further include pre-training the deep-learning-based encoder. The deep-earning-based encoder may be adapted to generate latent feature space representations of input audio signals. Pre-training the deep-learning-based encoder may involve inputting the mixed audio signal and the reference audio signals to the deep-learning-based encoder, generating, by the deep-learning-based encoder, latent feature space representations of the mixed audio signal and the reference audio signals, generating, for each reference audio signal, a mask for the reference audio signal based on the latent feature space representation of the reference audio signal using a softmax function, determining representations of the extracted audio signals by applying the generated masks to the latent feature space representation of the mixed audio signal, applying a deep-learning based decoder to the representations of the extracted audio signals to obtain estimates of the extracted audio signals, wherein the deep-learning-based decoder is adapted to perform the reverse operation of the deep-learning-based encoder, and training the deep-learning based encoder in such manner that a signal-distortion-ratio for the decoded estimates of the extracted audio signals and respective reference audio signals is minimized.

In some embodiments, the representation of the mixed audio signal may relate to a Mel feature space representation generatable from the mixed audio signal by a Mel encoder. The Mel feature space representation may relate to a Mel frequency cepstrum representation. A corresponding Mel decoder and the separation stage may be jointly trained to minimize a joint loss function that includes a contribution from the Mel transformation and a contribution relating to the difference function. The Mel decoder may include or correspond to a MelGAN.

In some embodiments, the representation of the mixed audio signal may relate to a Problem Agnostic Speech Encoder, PASE, feature space representation generatable from the mixed audio signal by a deep-leaning-based PASE encoder. A PASE decoder corresponding to the PASE encoder and the separation stage may be jointly trained to minimize a joint loss function that includes a contribution from the PASE transformation and a contribution relating to the difference function.

Both the Mel feature space and the PASE feature space are specifically tailored to speaker separation and thus allow for accurate and efficient separation. The proposed methods provide an efficient framework for implementing these feature spaces.

In some embodiments, the sound sources may relate to speech sources. In other words, the sound sources may relate to speakers, for example in a telephone conference or the like.

Retaining speaker continuity is particularly important in audio applications involving plural speakers, such as telephone conferences or video conferences. Speaker continuity is reliably ensured by the proposed methods.

In some embodiments, the separation stage of the system may be based on one of a Conv-TasNet architecture, a DPRNN architecture, a WaveNet architecture, and a Demucs architecture.

According to another aspect, a method of sound source separation using a deep-learning-based system is provided. The system may include a separation stage for frame-wise extraction of representations of sound sources from a representation of an audio signal. The system may further include a clustering stage for generating, for each frame, a vector indicative of an assignment permutation of extracted frames of representations of sound sources to respective sound sources. The representation of the audio signal may be a waveform-based representation. The method may include generating a representation of a mixed audio signal by applying a waveform-based transformation operation to the mixed audio signal. The representation may be a waveform-based representation. The mixed audio signal may include at least two sound sources. The method may further include inputting the representation of the mixed audio signal to the separation stage, for the separation stage to generate frames of extracted representations of sound sources. The method may further include inputting the frames of the extracted representations of sound sources to the clustering stage, to generate, for each frame of the mixed audio signal, a vector indicative of an assignment permutation of extracted frames of representations of sound sources to respective sound sources that had been chosen for the respective frame of the mixed audio signal. The method may further include clustering the vectors generated by the clustering stage in accordance with a clustering algorithm, and determining (estimates of) respective assignment permutations that had been chosen for the frames of the mixed audio signal based on the belonging of the vectors to different clusters, each cluster representing a specific assignment permutation. The method may further include assigning the extracted frames of representations to a set of audio streams in accordance with the determined assignment permutations. The method may yet further include applying an inverse of the waveform-based transform to the set of audio streams, to generate waveform audio streams of the extracted sound sources.

According to another aspect, a computer program is provided. The computer program may include instructions that, when executed by a processor, cause the processor to carry out all steps of the methods described throughout the disclosure.

According to another aspect, a computer-readable storage medium is provided. The computer-readable storage medium may store the aforementioned computer program.

According to yet another aspect an apparatus including a processor and a memory coupled to the processor is provided. The processor may be adapted to carry out all steps of the methods described throughout the disclosure.

It will be appreciated that apparatus features and method steps may be interchanged in many ways. In particular, the details of the disclosed method(s) can be realized by the corresponding apparatus, and vice versa, as the skilled person will appreciate. Moreover, any of the above statements made with respect to the method(s) are understood to likewise apply to the corresponding apparatus, and vice versa.

BRIEF DESCRIPTION OF DRAWINGS

Example embodiments of the disclosure are explained below with reference to the accompanying drawings, wherein.

DETAILED DESCRIPTION

The Figures (Figs.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Speaker source separation (e.g., deep-learning-based multi-talker source separation) targets at separating each speaker's voice from their mixture signal (mixed audio signal), which is modeled as the sum of individual speaker signals. Deep-learning-based sound source separation (e.g., multi-talker source separation) aims at separating each sound source (e.g., each speaker's voice) from their mixture signal using deep neural networks.

Figure 1:
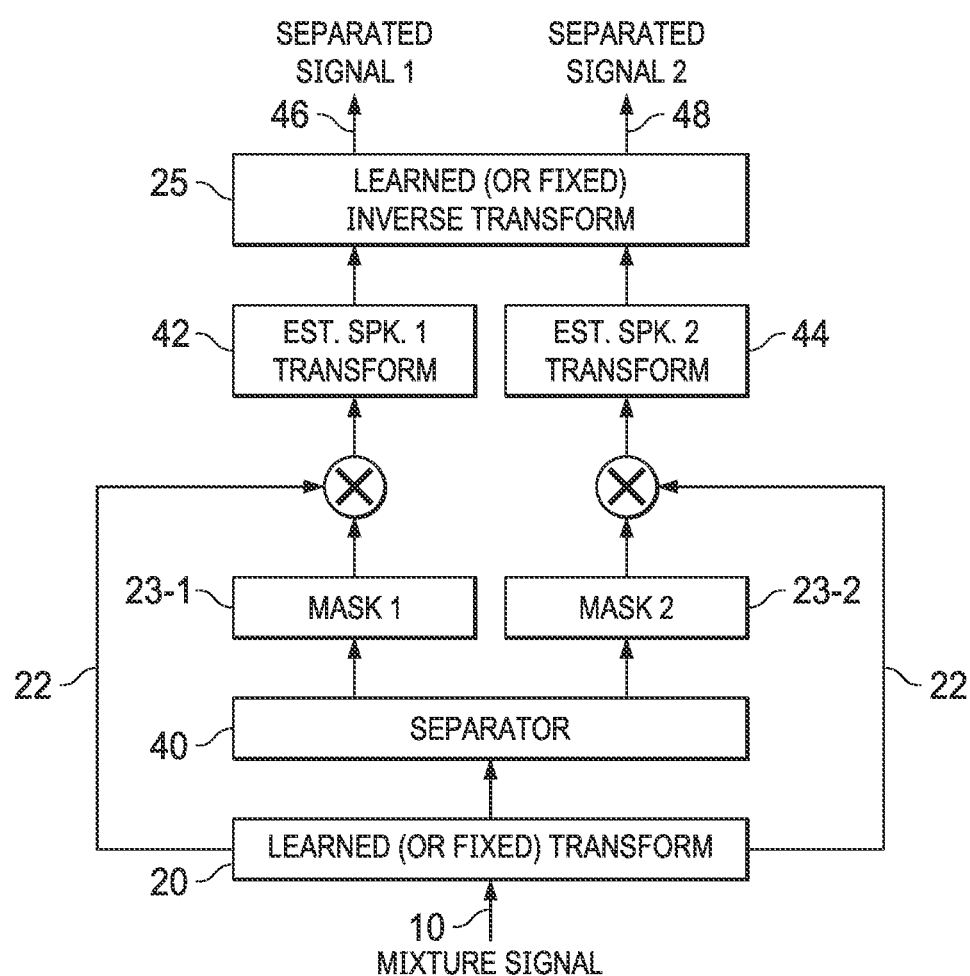
FIG. 1 is a schematic illustration of a standard deep-learning-based framework for speaker source separation.

Some methods rely on processing spectrograms or waveforms, and these are generally based on the structure schematically illustrated in FIG. 1. In this standard deep-learning-based framework, either spectrograms (with a fixed transform, e.g., STFT) or waveform-based signals (e.g., with a learnable transform) may be processed. In general, spectrogram-based models use signal-processing-driven transforms whereas waveform-based models may optimize learnable transforms jointly with the rest of the network. Notably, FIG. 1 only shows a two-speaker case, but the standard deep-learning-based framework may be readily extended to more than two speakers or sound sources in general.

In spectrogram-based approaches, the input mixture signal (mixed audio signal) 10 is first transformed to a time-frequency representation 22 using established signal processing transforms 20, such as the Short Time Fourier Transform (STFT). Next, a separator 40, which is implemented by a deep neural network, is employed to learn a set of masks 23-1, 23-2, one for each speaker. The mask values for each time-frequency bin denote the degree of presence of each speaker on this time-frequency bin. These estimated masks 23-1, 23-2 are then multiplied with the mixture representation 22, to obtain the separated speaker spectrograms 42, 44. Finally, an inverse transform 25, such as the inverse STFT (ISTFT), is used to obtain separated waveforms 46, 48. In spectrogram-based models, only the separator 40 is learnable (trainable), whereas the signal transforms 20, 25 are, for example, STFT/ISTFT.

In waveform-based methods, the signal transform 20 and its inverse 25 may be both learnable, meaning that they may be jointly optimized with the separator 40 during training. The forward transform 20, usually termed an encoder, transforms the mixture signal 10 into a high dimensional latent space (such as 512-dim latent space, for example) typically using 1-D convolutional layers, and the decoder (learnable inverse transform) 25 converts the latent space back to the waveform domain.

Compared to spectrogram-based methods, waveform-based models work on a higher temporal resolution (i.e., spectral frames vs. waveform samples), which makes waveform-based models computationally demanding.

The most useful speaker separation models are trained to be speaker independent. Hence, a priori, the identity (e.g., label) of the separated speakers is unknown. Training such speaker-independent separations models suffers from the permutation ambiguity problem, which will be described next.

In more detail, for training a speaker separation model (e.g., the model of FIG. 1), the parameters of the model are iteratively updated by minimizing a loss function defined as the difference between the estimated signals and the reference (ground truth) signals.

Taking a two-speaker case as an example, for a mixture signal x two reference speech signals (ref1, ref2) are available to compute the loss function, and the model separates two speech estimates (est1, est2). However, since the trained model is assumed to be speaker-independent (rather than designed for two specific speakers), the identity of the speakers is unknown. Hence, the corresponding reference identity is unknown at the time of computing the loss function. Consequently, there are two valid ways of assigning the estimates to the references (defined as permutations or assignment permutations) when computing the loss function, namely [est1→ref1, est2→ref2] and [est2→ref1, est1→ref2]. The loss associated with each permutation may be (schematically) defined as:

$$loss_{perm1} = |est1-ref1| + |est2-ref2| \quad (1)$$

$$loss_{perm2} = |est2-ref1| + |est1-ref2| \quad (2)$$

Specifically, the loss could be defined as in the following example:

$$loss_{perm1} = \log|est1-ref1|^2 + \log|est2-ref2|^2 \quad (1a)$$

$$loss_{perm2} = \log|est2-ref1|^2 + \log|est1-ref2|^2 \quad (2a)$$

It is understood that Eq. (1) and Eq. (2) describe the general principle of dealing with different permutation assignments in calculating the loss, and that these equations should not be construed as limiting the present disclosure. For instance, squares of the difference terms |•| could be alternatively used, or logarithms thereof, or logarithms of squared difference terms etc. It is also understood that Eq. (1), Eq. (1a), Eq. (2), and Eq. (2a) are schematic equations that omit any indices denoting frames, samples, etc., and that specific implementations of losses would include such indices as well as appropriate sums over these indices.

To further illustrate the problem, it may be useful to consider the speaker-dependent source 20 separation formulation for which the permutation ambiguity does not exist. In such example, all mixture signals always contain the same two speakers. Hence, one can always assign est1 to ref1 (speaker 1), and est2 to ref2 (speaker 2) during training, which corresponds to Eq. (1) above. As a result, the network will memorize the differences between the two speakers, and at separation time, the model can always output est1 as speaker 1, and est2 as speaker 2.

However, for a speaker independent task, which aims at separating mixtures of any two speakers, the training set must contain a variety of speakers, including, for example, different/same genders, ages, pitch, loudness, etc. Thus, there is ambiguity when choosing between Eq. (1) and Eq. (2) as the loss for each specific mixture signal. In addition, if an arbitrary assignment permutation is used, the model training will typically not converge due to wrong or inappropriate targets.

As a main result of the permutation ambiguity during training, the resulting speaker separation models may suffer from speaker identity swaps in some portions of the separated signals.

A widely used method to train deep neural networks for speech source separation is based on choosing the permutation in Eq. (1) or Eq. (2) that provides the smaller loss, and subsequently minimizing this loss to update the network. This approach is known as Permutation Invariant Training (PIT).

Figure 2:
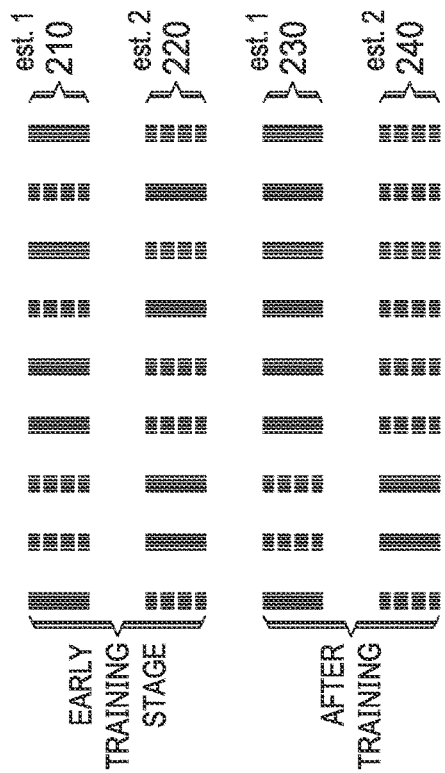
FIG. 2 is a schematic illustration of utterance-level permutation-invariant training of a deep-learning-based framework for speaker source separation.

There are two basic types of PIT: utterance-level PIT (uPIT) (see, e.g., Morten Kolbak et al., Multitalker speech separation with utterance-level permutation invariant training of deep recurrent neural networks, https://arxiv.org/pdf/1703.06284.pdf) and frame-level PIT (tPIT) (see, e.g., Dong Yu et al., Permutation Invariant training of deep models for speaker-independent multi-talker speech separation, https://arxiv.org/pdf/1607.00325.pdf). These approaches compute the permutation error at different time scales. In uPIT, the error associated with each permutation in Eq. (1) and Eq. (2) is computed over the entire length of signals (i.e., utterances). Thus, the best frame-level permutation is enforced by the uPIT training to be identical as the best utterance-level permutation. However, this goal is not always fulfilled by the training process. FIG. 2 depicts the training progress for uPIT. In the early stage, the speaker identity (denoted by different patterning) may frequently swap over frames in the separated signals 210, 220. uPIT attempts to enforce global speaker consistency, in which the frames of est1 210, 230 ideally should all relate to one of the speakers (e.g., have all a vertical solid line pattern) and the frames of est2 220, 240 ideally should all relate to the other speaker (e.g., have all a vertical dashed line pattern), but in the illustrated example there is still speaker swap in local frames after uPIT training (e.g., in the first three frames of est1 230 and est2 240). That is, due to the suboptimal nature of uPIT at each local frame, it causes speaker swap in some portions of the separated signals est1, est2. However, since uPIT operates on the utterance level, it is still a very popular training loss for waveform-based and spectrogram-based models.

Figure 3:
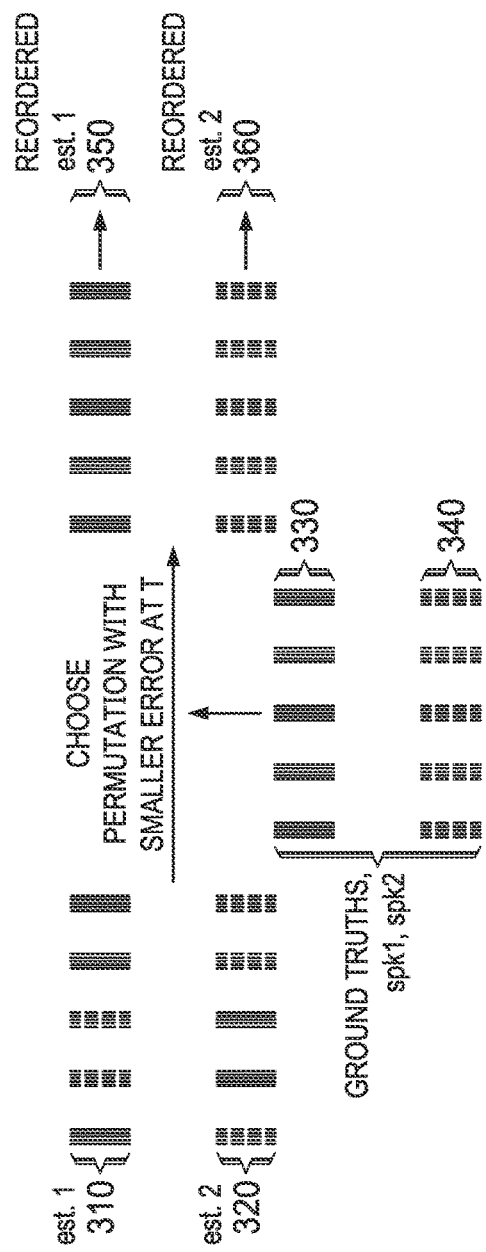
FIG. 3 is a schematic illustration of frame-level permutation-invariant training of a deep-learning-based framework for speaker source separation.

FIG. 3 depicts the training progress for tPIT. Differently from uPIT, the training process for tPIT looks for the best permutation independently for each frame of the mixed signals, by computing the local error at each frame. Thus, the best permutation at each frame is irrelevant to other frames. This locally optimal criterion ensures high quality source separation at each frame. The samples (or the spectral frequency components) within each frame of one output accurately belong to the same speaker. However, tPIT does not enforce global speaker coherence for the estimates est1 310 and est2 320, and thus is not a good method to track speakers (i.e., speaker identity, speaker coherence) across frames. To ensure speaker coherence across frames, tPIT would require ground truth signals (reference audio signals) 330, 340 at both training and testing time. In training, the smaller frame level permutation error is minimized, which yields the aforementioned high local speaker separation accuracy. During inference (i.e., at separation or testing time), tPIT can use the ground truth signals 330, 340 to reorganize frames of the same permutation identity into utterances to achieve reordered estimates est1 350 and est2 360. However, in practice ground truth signals are not available at testing time.

Given the above, there exists a trade-off between uPIT and tPIT-uPIT is designed to preserve speaker coherence along estimates (while compromising the quality of the separations), whereas tPIT is designed to locally separate speakers (while failing at preserving speaker coherence along estimates).

It is typically preferred to perform speech source separation in an end-to-end manner (i.e., waveform-in-waveform-out). As has been explained above, deep learning approaches for speech source separation either suffer from less than optimum separation quality or from the presence of the so-called sound source permutation ambiguity problem (e.g., speaker permutation ambiguity problem). The sound source permutation ambiguity problem remains unsolved especially for training sound-source independent (e.g., speaker independent) waveform-based separation models.

The present disclosure addresses the permutation ambiguity problem, especially for waveform-based separation models. It is applicable to any waveform-based model training for which the permutation ambiguity problem may occur.

Broadly speaking, the present disclosure uses a tPIT separation stage followed by a second stage implementing a speaker tracking model. This second stage may be a clustering stage as described below. Methods and systems according to the present disclosure work in a "generalized signal space" for waveform models, instead of relying on spectrograms. Since waveform-based models can be computationally demanding, the present disclosure proposes a memory efficient loss function for efficiently training the speaker tracking model (e.g., clustering stage) with linear memory complexity $O(T)$ instead of quadratic complexity $O(T^2)$.

As such, the present disclosure relies on a general three-stage framework for reducing or altogether avoiding permutation errors for waveform-based separation models:

The first stage sets up a pair of an encoder and a decoder that perform signal transform and inverse signal transform to/from a "generalized signal space" that is very flexible in its setup.

The second stage conducts high quality speaker separation at each time step in the transformed domain using frame-level permutation invariant training (tPIT).

The third stage tracks (permutation) identities over time dealing with the speaker permutation ambiguity problem via a clustering model.

Accordingly, part of the present disclosure may be summarized to relate to tPIT followed by clustering in a generalized signal space for waveform models, and in particular to efficient training of a tPIT separation stage followed by a stage for speaker tracking for waveform-based models. Relying on waveform-based models in a "generalized signal space" for PIT combined with speaker tracking allows to project (or map) the input data into a wide range of (pre-trained or fixed) latent spaces or other feature spaces, thereby providing for additional flexibility and adaptability of the sound source separation. Notably, using tPIT and clustering for waveform-based models has not been used in conventional approaches.

Figure 4:
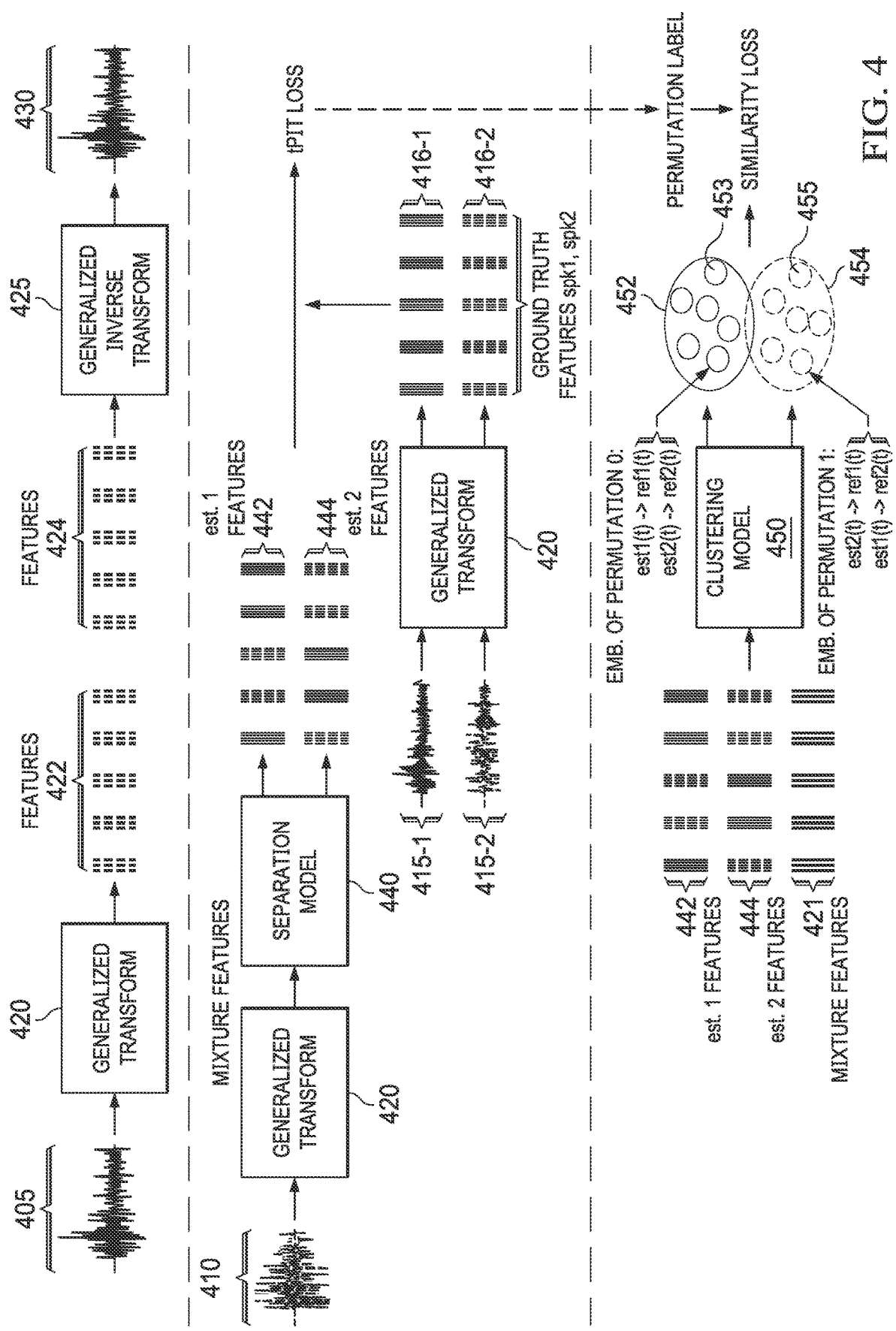
FIG. 4 is a schematic high-level illustration of an example of a proposed method of training a deep-learning-based system for sound source separation according to an embodiment of the disclosure.

FIG. 4 is a schematic high-level illustration of an example of the proposed method of training a deep-learning-based system for sound source separation (e.g., speech source separation). Training of the system may amount to (iteratively) determining (or tuning) parameters for the deep learning model(s) (e.g., deep neural networks(s)) that is/are used for implementing the system.

The system comprises three stages: generalized signal transform (top panel), tPIT separation (middle panel), and clustering (bottom panel). In some implementations, the generalized signal transform stage may be configured such that the system would directly operate on waveform audio signals (e.g., segmented waveform signals). In some of such cases, the transform stage could be said to be absent from the system.

In more general terms, the system comprises a transform stage 420 (optional in some implementations), a separation stage 440, and a clustering stage 450. If the system comprises the transform stage 420, it further comprises an inverse transform stage 425. The system is understood to be adapted to perform sound source separation for a mixed audio signal 410 that is input to the system. Here, the mixed audio signal 410 is a waveform audio signal. It may include a plurality of different sound sources (e.g., speakers). For example, it may be obtainable as a mixture of (signals of) the different sound sources.

Broadly speaking, the transform stage 420 is generally adapted to transform an input (waveform) audio signal 405 to a representation 422 of the (waveform) audio signal. The separation stage 440 is adapted for frame-wise extraction of representations of sound sources from a representation of an input audio signal (e.g., the mixed audio signal 410). The clustering stage 450 is adapted for generating, for each frame, a vector (e.g., embedding vector) indicative of an assignment permutation of extracted frames of representations of sound sources to respective sound sources (or to labels of sound sources).

Figure 5:
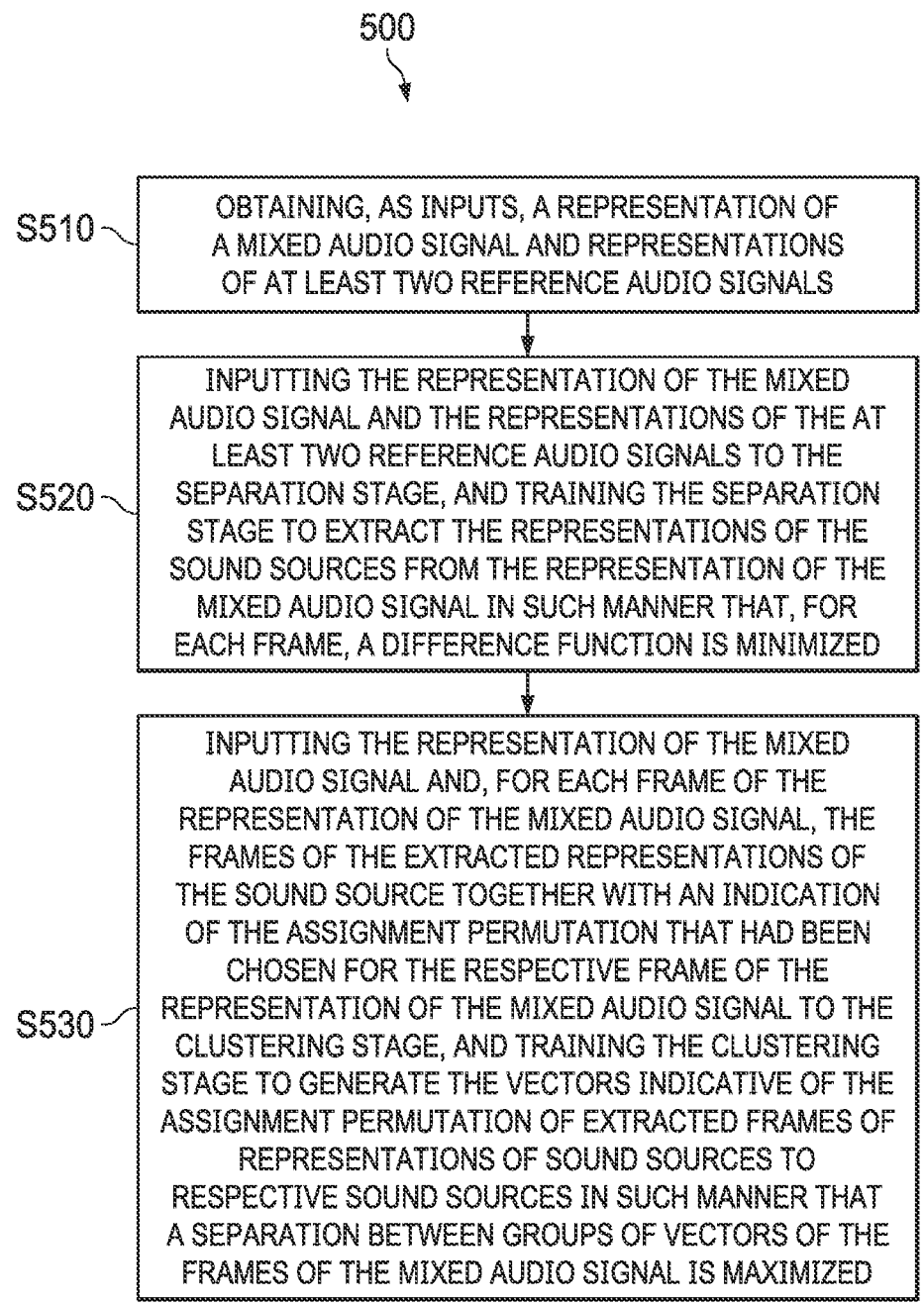
FIG. 5 is a flowchart illustrating an example of the proposed method of training the deep-learning-based system for sound source separation according to an embodiment of the disclosure.

An example of a method 500 of training the above system for sound source separation will be described next with reference to the flowchart of FIG. 5. It includes at least training the separation stage 440 and training the clustering stage 450.

Step S510 of method 500 is a step of obtaining, as inputs, a representation of a mixed audio signal and representations of at least two reference audio signals. As noted above, the representations are waveform-based representations. The mixed audio signal includes at least two sound sources, and the reference audio signals correspond to respective ones of the sound sources included in the mixed audio signal. As such, the reference audio signals serve as ground truth signals for training the separation stage.

The aforementioned representations may be obtained by applying the transform stage to the mixed audio signal and to the reference audio signals, for example.

Step S520 is a step of inputting the representation of the mixed audio signal and the representations of the at least two reference audio signals to the separation stage, and training the separation stage to extract the representations of the sound sources from the representation of the mixed audio signal. This is done in such manner that, for each frame, a difference function is minimized. Here, the difference function represents a loss function in the context of training the separation stage. Moreover, the difference function is based on differences between frames of extracted representations of sound sources and frames of representations of reference audio signals. In some implementations, the difference function is indicative of a combined difference (e.g., combination of differences) between frames of extracted representations of sound sources and frames of representations of reference audio signals. The combined difference includes, for each extracted representation of a sound source (i.e., for each estimated sound source), a difference between the frame of the extracted representation of the sound source and a respective frame of a representation of a reference audio signal. Thus, for the example case of two sound sources, there would be two difference terms in the combined difference. Examples of the difference function (loss function) for the case of two sound sources are given above in Eq. (1) and Eq. (2). Therein, for each frame, such assignment permutation of extracted representations of sound sources and representations of reference audio signals is chosen for minimization that results in the smaller (or generally, smallest) difference function. Accordingly, the separation stage is trained in a tPIT framework.

Step S530 is a step of inputting the representation of the mixed audio signal and, for each frame of the representation of the mixed audio signal, the frames of the extracted representations of the sound source together with an indication of the assignment permutation that had been chosen for the respective frame of the representation of the mixed audio signal into the clustering stage, and training the clustering stage to generate the (embedding) vectors indicative of the permutation assignment of extracted frames of representations of sound sources to respective sound sources. This is done in such manner that a separation between groups of vectors of the frames of the mixed audio signal is maximized. Therein, the vectors of the frames are grouped in accordance with the respective assignment permutations indicated by these vectors. In other words, the vectors of the frames are grouped in accordance with the known permutation labels that had been used for the frames.

Returning to FIG. 4, details of the transform stage 420 will be described next. Generally, the transform stage 420 is adapted to transform the mixed (waveform) audio signal 410 (or any input waveform audio signal 405) to a representation 422 of the mixed audio signal. This representation is a waveform-based representation. Accordingly, the mixed audio signal is transformed to a signal space that is a waveform-based signal space. For instance, the signal space may not be a frequency-domain signal space and it may not be based on spectrograms (i.e., the transformation may not involve determining spectrograms). In yet other words, the transform may not involve a time-frequency transformation. In particular, the transformation may not relate to a STFT.

FIG. 4 shows the transformation of an input waveform audio signal 405 to a set of generalized features 422. These features may relate to (short) frames of the input waveform audio signal, or to features in a latent feature space, for example. For ease of reference, the signal space may be referred to as a generalized signal space in the remainder of the disclosure. The inverse transform stage 425 is adapted to transform representations of audio signals 424 back to the waveform domain, i.e., to waveform audio signals 430. Specifically, the inverse transform stage 425 can be used for transforming extracted representations of sound sources back to the waveform domain.

By considering a transform stage as described above, the system operates on waveform-based representations of audio signals, or directly on waveform audio signals. The present disclosure thus applies a combined tPIT and clustering strategy to waveform-based models. Instead of working in the STFT domain, the stage known as the tPIT stage in conventional models is now split into two stages: a signal transform stage, and the tPIT separation stage. This split or reformulation enables much more generalized signal transforms suitable for waveform-based models.

Examples of the generalized transforms performed by the transform stage are described next.

(i) Short waveform frames (time domain). In this case, the signal transform simply segments a waveform into short frames, and the inverse transform reconstructs the waveform by adding the frames with overlapping. The ground truth for the tPIT loss is defined over the waveform samples directly in the time domain.

(ii) Pretrained encoder-decoder optimized for speaker separation. In this case, the encoder/decoder is first pretrained with ideal masks (i.e., without the deep learning-based separator) to project the waveform into a space optimized for speaker separation. Next, the encoder/decoder are fixed, and tPIT is used to train the separator model in this learned space.

(iii) Mel-space encoding and MelGAN decoder. The Mel domain is derived from human perception, thus is a natural choice for speaker source separation. The target for tPIT is the Mel features of the ground truth waveforms. A MelGAN (see, e.g., Kundan Kumar et al., MelGAN: generative adversarial networks for conditional waveform synthesis, https://arxiv.org/pdf/1910.06711.pdf), which is a DL-based generative model, is trained to accurately reconstruct the signal phase from separated Mel features. The advantage of conducting separation in the Mel domain is that it decouples the separation task from phase modeling, and thus uses low time resolution.

(iv) Deep learning-based problem agnostic speech encoder (PASE) and decoder. PASE (see, e.g., Santiago Pascual et al., Learning problem-agnostic speech representations from multiple self-supervised tasks, https://arxiv.org/pdf/1904.03416.pdf) is a deep learning-based speech feature extractor. The PASE encoder is pretrained to learn general-purpose deep features that encode various levels of signal abstractions. A PASE decoder is trained to do the inverse transform. PASE has the same advantage of low time resolution as Mel features, but may be more expressive than Mel.

In line with the above, the transformation operation applied by the transform stage 420 may involve one of segmenting the mixed audio signal into a plurality of frames in the time domain (see example formulation (i)), deep-learning-based encoding for projecting the mixed audio signal into a latent feature space optimized for sound source separation (see example formulation (ii)), Mel-space encoding (see example formulation (iii)), and deep-learning-based problem agnostic speech encoding (see example formulation (iv)). If applicable, the transform stage and/or the inverse transform stage may be trained jointly with the separation stage (and possibly, the clustering stage).

As noted above, the system may also comprise an inverse transform stage 425 that transforms the extracted representations of sound sources back to the waveform domain. For the case of Mel-encoding, the inverse transform stage may include or correspond to a MelGAN decoder.

While a selection of implementations of generalized transforms are listed above in example formulations (i) through (iv), the present disclosure shall not be construed as limited to these implementation examples. Any kind of (waveform-based) transform could be employed under the generalized framework for speech source separation of the present disclosure. For this reason, the proposed source separation framework is herein referred to an operation relying on a "generalized signal space".

For the first two generalized transforms above (example formulations (i) and (ii)), high (sample-based) time resolution is required. This results in a large number of frames for the clustering stage. A pairwise similarity loss as described below in Eq. (10) would become too memory expensive to train the clustering model with such a high temporal resolution. The present disclosure propose a memory-efficient similarity loss that makes training of the clustering model feasible.

Next, the separation stage 440 is described in more detail. In general, the separation stage 440 is adapted for framewise extraction of (waveform-based) representations of sound sources from a (waveform-based) representation of an input audio signal 410. As noted above, the input audio signal may be a mixed audio signal including a plurality of sound sources.

The separation stage 440 outputs frames of extracted representations of audio sources 442, 444. At the time of training, representations of reference audio signals 416-1, 416-2 (i.e., representations of ground truth signals) are used for iteratively training the separation stage 440 to minimize the loss function (tPIT loss function). Therein, the representations of reference audio signals 416-1, 416-2 may be obtained by applying the transform stage 420 to reference audio signals (ground truth signals) 415-1, 415-2. The loss function for a given frame of the mixed audio signal can be determined by comparing the frames of the extracted representations of the sound sources 442, 444 that had been extracted from the given frame of the representation of the mixed audio signal to respective representations of the ground truth signals 416-1, 416-2, in accordance with the applicable assignment permutation. There is one such loss function for each possible assignment permutation, and in the end that assignment permutation is chosen that yields the smallest loss function. The separation stage 440 is then trained to minimize this loss function.

The separation stage 440 outputs, as estimates est1 and est2, streams of frames of the extracted representations of sound sources 442, 444. Due to the sound source ambiguity for training in a tPIT framework, each stream may include frames relating to different sound sources.

Examples of training the separation stage 440 in the tPIT framework for different transformations performed by the transform stage 425 are described next.

Figure 6:
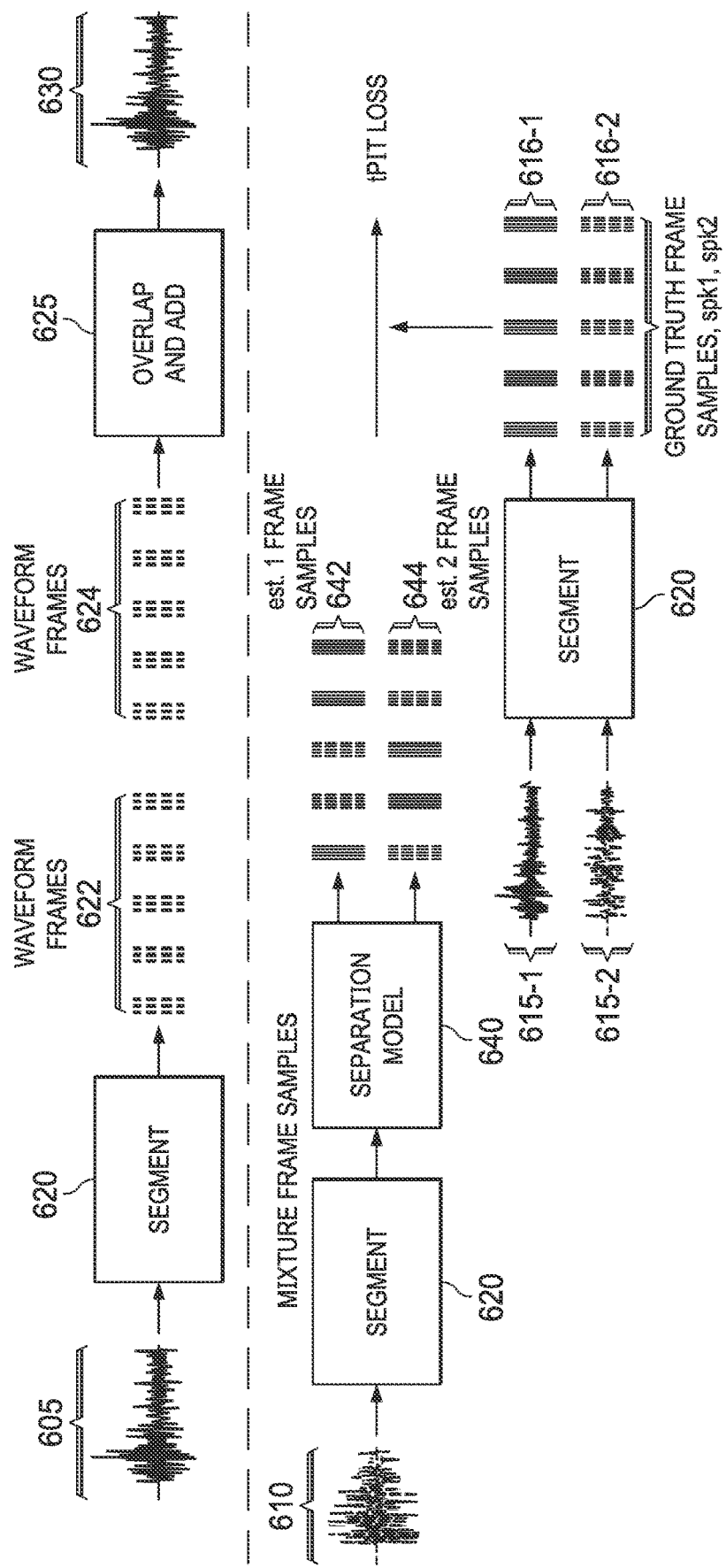
FIG. 6 is a schematic illustration of an example of training a separation stage of the deep-learning-based system for a first example of a waveform-based representation of audio signals according to an embodiment of the disclosure.

(i) Short waveform frames (time domain). FIG. 6 is a schematic high-level illustration of an example of the proposed method of training the deep-learning-based system for sound source separation if the representation of the mixed audio signal relates to a segmentation of the mixed audio signal into (short) waveform frames. In this case, the transform stage 620 relates to a segmentation stage that segments an input audio signal 605 into (short) waveform frames 622 (represented by a sparse vertical dashed lines pattern in FIG. 6). Each frame contains samples of a short waveform segment. The mixture waveform 610, as well as the ground truth signals 615-1, 615-2 (ref1, ref2), are segmented into very short frames. No signal transform to another space is needed. The mixture frames are processed by the speaker separation model (separation stage 640), and the output frames 642, 644 (est1, est2), also in the time domain, are compared to the frames 616-1, 616-2 of the ground truth signals using tPIT. For frame t in the two-speaker case, the tPIT loss for each permutation is computed as:

$$\text{loss}_{perm1}(t) = \sum_{l=1}^{L}|est1(t,l) - ref1(t,l)| + \sum_{l=1}^{L}|est2(t,l) - ref2(t,l)| \quad (3)$$

$$\text{loss}_{perm2}(t) = \sum_{l=1}^{L}|est1(t,l) - ref2(t,l)| + \sum_{l=1}^{L}|est2(t,l) - ref1(t,l)| \quad (4)$$

where L denotes the frame length in samples, and the smaller loss is selected and minimized by the separation model. For example, the total number of samples within a frame L is in the range of 2-16 samples. Alternatively or additionally, L may be selected in dependence of the sampling rate, such that the frame corresponds to a duration of 0.25-2 ms.

In expressions (3) and (4), squares of the difference terms $|\cdot|$ could alternatively be used, or logarithms thereof, or logarithms of squared difference terms etc. At separation time, the reordered frames (the order predicted by the clustering model, which is not shown here) are added in the inverse transform stage 625 with overlapping to reconstruct each separated utterance. In this sense, the inverse transform stage 625 may be said to relate to an overlap and add stage.

In other words, the tPIT operates in the time domain directly over short waveform frames of the mixed audio signal 610. The reference audio signals (ground truth signals) 615-1, 615-2 are likewise segmented into sequences of (short) waveform frames 616-1, 616-2 by the transform stage 620. The separation stage 640 generates frames of extracted audio sources 642, 644 (represented by vertical dashed lines and vertical solid lines patterns in FIG. 6). The frames of extracted audio sources 642, 644 are compared to the frames 616-1, 616-2 of the reference audio signals in the tPIT framework, and the loss function (difference function) is minimized.

Accordingly, the separation stage 640 may be trained to determine, for each frame of the mixed audio signal 610, frames of extracted sound sources 642, 644 from the frame of the mixed audio signal 610 in such manner that a loss function $$\sum_{n=1}^{N}\sum_{l=1}^{L}|est_n(t,l) - ref_{\Pi_k(n)}(t,l)| \quad (5)$$

is minimized, wherein t indicates the frame, l denotes the sample number within the frame, L is the total number of samples within the frame, n indicates the label of the extracted sound source, N is the total number of extracted sound sources, est denotes a frame of an extracted sound source, ref denotes a frame of a reference audio signal, and $\Pi_k(n)$ is a permutation mapping for labels n=1, . . . , N and indicates the label of the reference audio signal. Alternatively, squares of the difference terms $|\cdot|$ could be used, or logarithms thereof, or logarithms of squared difference terms etc. As noted above, for each frame that permutation mapping $\Pi_k$ is chosen that yields the smallest loss function. Due to the manner in which it is constructed, the loss function may be referred to as a difference function.

Notably, the loss function of Eq. (5) is applicable to the generic case of N sound sources that are included in the mixed audio signal 610.

Here and in the remainder of this disclosure, reordering (or reorganizing) frames is understood in the sense of re-assigning frames to different sound sources. For example, at a given time, the two frames of est1 and est2, respectively, may be swapped. The reordering however does not imply a reordering along the time axis, i.e., a swapping of frames for different times.

Figure 7:
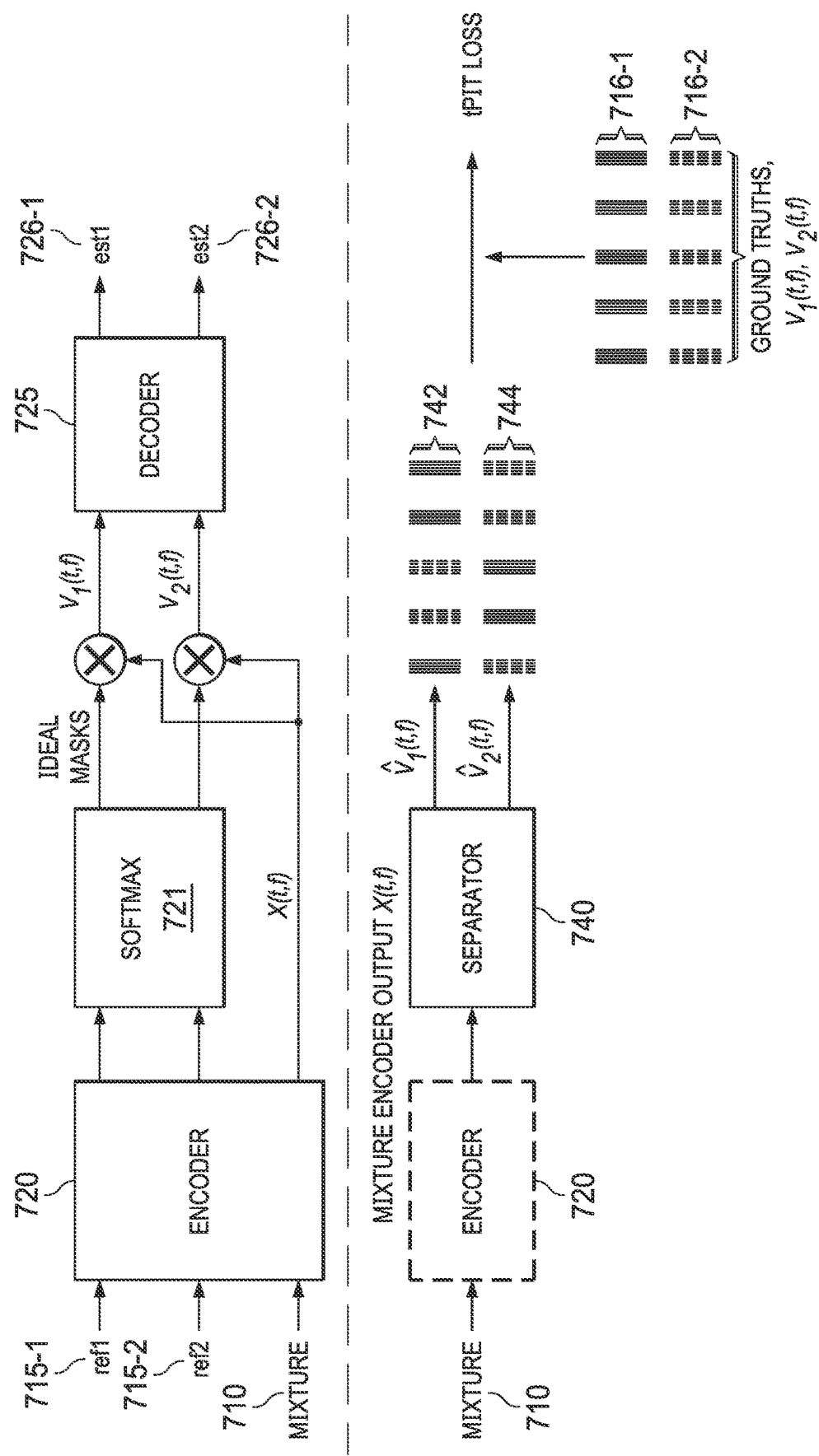
FIG. 7 is a schematic illustration of an example of training the separation stage of the deep-learning-based system for a second example of the waveform-based representation of audio signals according to an embodiment of the disclosure.

(ii) Pretrained encoder-decoder optimized for speaker separation. Instead of computing tPIT directly in the time domain, one can perform tPIT in a pretrained latent space optimized for speaker separation. In this case, the aforementioned representation of the mixed audio signal may be said to relate to a latent feature space representation generated by a (pretrained) deep-learning-based encoder. A high-level representation of this case is schematically illustrated in FIG. 7. The encoder 720/decoder 725 are pretrained using ideal masks to learn an optimized latent space for speaker separation. Then, the separator 740 is trained in this space using tPIT, with the encoder 720 and decoder 725 frozen/fixed (the fixed encoder 20 being indicated by a dashed block in FIG. 7).

The top panel of FIG. 7 depicts a scheme for pretraining the encoder/decoder components of the source separation network (source separation system). During pretraining the encoder/decoder, ideal masks are generated from the ground truth encoder features (i.e., from the generated representations of the reference audio signals 715-1, 715-2) by the softmax function 721. The decoder 725 converts the separated latent features $V_1(t, f)$, $V_2(t, f)$ for each speaker back to the waveform domain, to estimates est1, 726-1 and est2, 726-2. The loss (loss function) used to learn the encoder/decoder transforms is based on optimizing (e.g., minimizing) a signal-to-distortion-ratio of the estimated speech sources est1, est2 with respect to the ground truth speech signals ref1, ref2. Further details on how to pretrain the encoder/decoder are given in Efthymios Tzinis et al., Two-step sound source separation: training on learned latent targets, https://arxiv.org/pdf/1910.09804.pdf.

Accordingly, pre-training the deep-learning-based encoder 720 involves inputting the mixed audio signal 710 and the reference audio signals 715-1, 715-2 to the deep-learning-based encoder 720, and generating, by the deep-learning-based encoder 720, latent feature space representations of the mixed audio signal and the reference audio signals. Further, for each reference audio signal 715-1, 715-2, a mask for the reference audio signal 715-1, 715-2 is generated based on the latent feature space representation of the reference audio signal, using the softmax function 721. Representations of the extracted audio signals are determined by applying the generated masks to the latent feature space representation of the mixed audio signal. The deep-learning based decoder 725 is applied to the representations of the extracted audio signals to obtain estimates of the extracted audio signals 726-1, 726-2, wherein the deep-learning-based decoder 725 is adapted to perform the reverse operation of the deep-learning-based encoder 720. In this framework, the deep-learning based encoder 720 (and accordingly, also the deep-learning based decoder 725) is (iteratively) trained in such manner that a signal-distortion-ratio for the decoded estimates of the extracted audio signals 726-1, 726-2 and respective reference audio signals 715-1, 715-2 is minimized.

The bottom panel of FIG. 7 depicts a scheme for actually training the separator 740 of the source separation model (source separation system). Notably, this training proceeds in the tPIT framework, i.e., the training is tPIT. Specifically, after pretraining the encoder/decoder, their parameters are set frozen (indicated by the dashed block 720), and the separator component (separation stage 740) takes the mixture latent space representation X(t,f) (representation of the mixed audio signal 710) provided by the encoder 720. The separation stage 740 learns the features of the estimated signals 742, 744 in the latent space $\hat{V}_1(t, f)$ and $\hat{V}_2(t, f)$. The goal is to make $\hat{V}_1(t, f)$ and $\hat{V}_2(t, f)$ match the features 716-1, 716-2 of the ground truth signals in the latent space $V_1(t, f)$ and $V_2(t, f)$ as close as possible. Here, $V_1(t, f)$ and $V_2(t, f)$ are the pretrained latent targets derived from the ideal masks. For the present example, the tPIT permutation error at each time step t may be computed as:

$$\text{loss}_{perm1}(t) = \sum_f |\hat{V}_1(t, f) - V_1(t, f)| + |\hat{V}_2(t, f) - V_2(t, f)| \quad (6)$$

$$\text{loss}_{perm2}(t) = \sum_f |\hat{V}_2(t, f) - V_1(t, f)| + |\hat{V}_1(t, f) - V_2(t, f)| \quad (7)$$

Alternatively, squares of the difference terms |•| could be used, or logarithms thereof, or logarithms of squared difference terms etc. Again, the smaller loss is minimized at each time step, in line with the tPIT paradigm. Minimizing the tPIT loss will ensure that all the frequency components in a separated frame belong consistently to the same speaker. After reorganizing the frames (described below), the pretrained decoder 725 converts them back to the waveform domain (i.e., to waveforms or waveform audio signals).

Accordingly, the separation stage 740 is trained to determine, for each frame of the mixed audio signal 710, frames of (representations of) extracted sound sources 742, 744 from the frame of the (representation of the) mixed audio signal in such manner that a loss function $$\sum_{n=1}^{N} \sum_f |\hat{V}_n(t, f) - V_{\Pi_k(n)}(t, f)| \quad (8)$$

is minimized, wherein t indicates the frame, f denotes the feature within the latent feature space, n indicates the label of the extracted sound source and reference audio signal, N is the total number of extracted sound sources, $\hat{V}$ denotes a frame of a representation of the extracted sound source, V denotes a frame of a representation of the reference audio signal, and $\Pi_k(n)$ is a permutation mapping for labels n=1, ..., N and indicates the label of the reference audio signal. Alternatively, squares of the difference terms |•| could be used, or logarithms thereof, or logarithms of squared difference terms etc. As noted above, for each frame that permutation mapping $\Pi_k$ is chosen that yields the smallest loss function. Due to the manner in which it is constructed, the loss function may be referred to as a difference function.

The representations of the reference audio signals may be determined based on the representation of the mixed audio signal and a set of masks, as noted above. The set of masks may have been determined in the process of pretraining the deep-learning-based encoder, based on the reference audio signals.

Notably, the loss function of Eq. (8) is applicable to the generic case of N sound sources that are included in the mixed audio signal 710.

(iii) Mel-space encoding and MelGAN decoder. In this example formulation, the representation of the mixed audio signal relates to a Mel feature space representation (e.g., Mel frequency cepstrum representation) generatable from the mixed audio signal by a Mel encoder. Mel filter-banks are derived from human perception, thus are a natural choice for speaker source separation. Since Mel spectrograms themselves do not model phase, a MelGAN, which is a recently proposed generative model (see, e.g., Kundan Kumar et al., Mel-GAN: generative adversarial networks for conditional waveform synthesis, https://arxiv.org/pdf/1910.06711.pdf) is trained to accurately reconstruct phase information from the Mel features. Decoupling the magnitude and phase modeling for speaker separation has a significant advantage. The separation model only needs to focus on the separation task in the spectrum magnitude domain (leaving the phase modeling to the MelGAN), whereas in the previous two example formulations (i) and (ii) the separator has to simultaneously do separation and phase modeling. Therefore, with Mel features, speaker separation could work with significantly lower time resolution while still reconstructing phase accurately. Thus, operating in the Mel feature space is computationally much cheaper than directly operating in the waveform domain.

Figure 8:
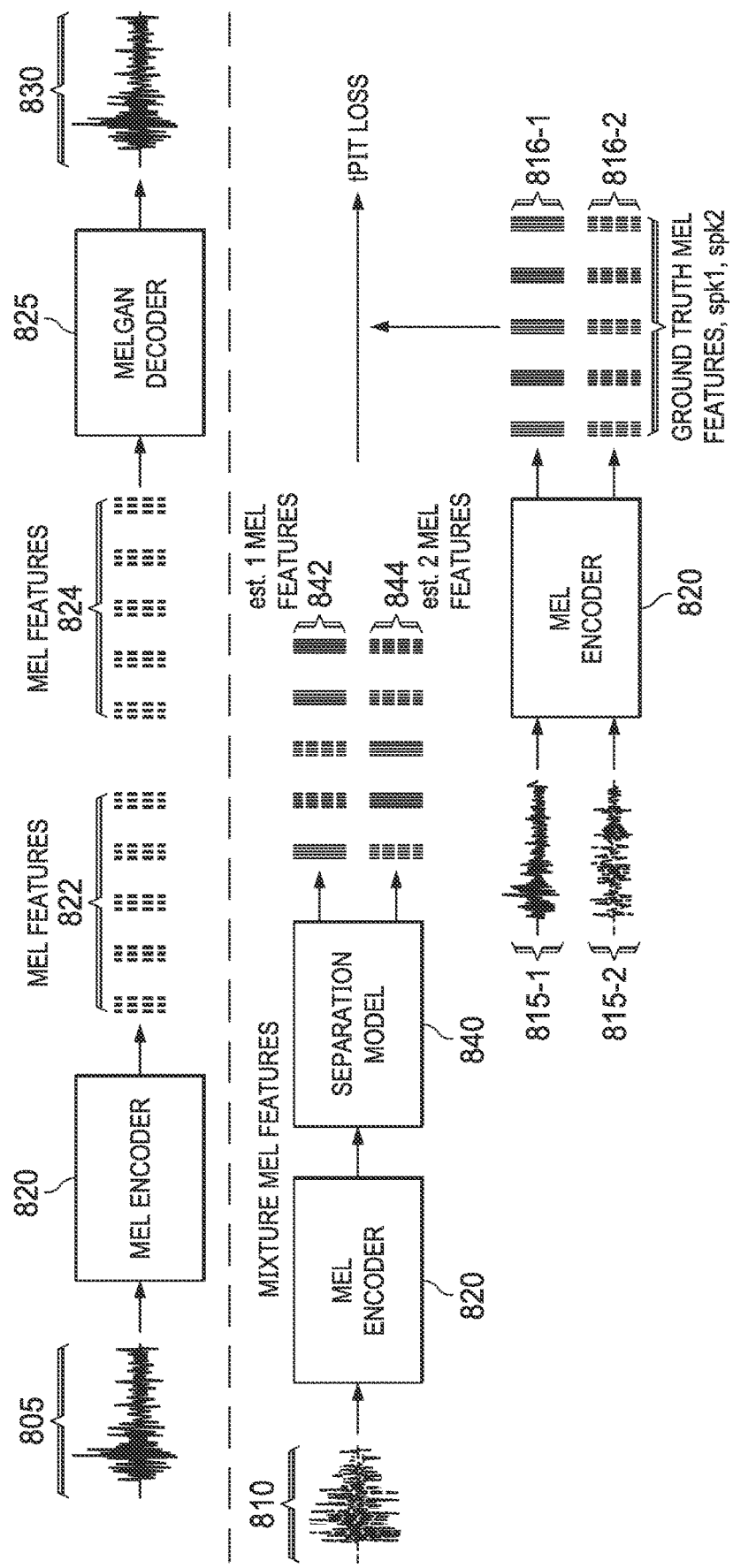
FIG. 8 is a schematic illustration of an example of training the separation stage of the deep-learning-based system for a third example of the waveform-based representation of audio signals according to an embodiment of the disclosure.

A high-level representation of the Mel/MelGAN case is schematically illustrated in FIG. 8. The top panel relates to the training of the MelGAN 825 and the bottom panel relates to the training of the separation model (separation stage) 840. A MelGAN 825 is first trained with Mel filterbank features 822 (frames with sparse vertical dashed lines pattern in FIG. 8) generated from a clean training set (input waveform audio signal 805) by a Mel encoder 820, and then the separation model 840 is trained in the Mel domain with tPIT. Frames with vertical solid lines and vertical dashed lines patterns in FIG. 8 correspond to separated frames 842, 844.

One way to train the MelGAN 825 is to use clean data without distortion, as in the example of FIG. 8. The Mel-GAN training is completely independent from the speaker separation training. After the separation with tPIT, the Mel features of each speaker are converted back to waveforms by the generator part of the MelGAN 825.

Figure 9:
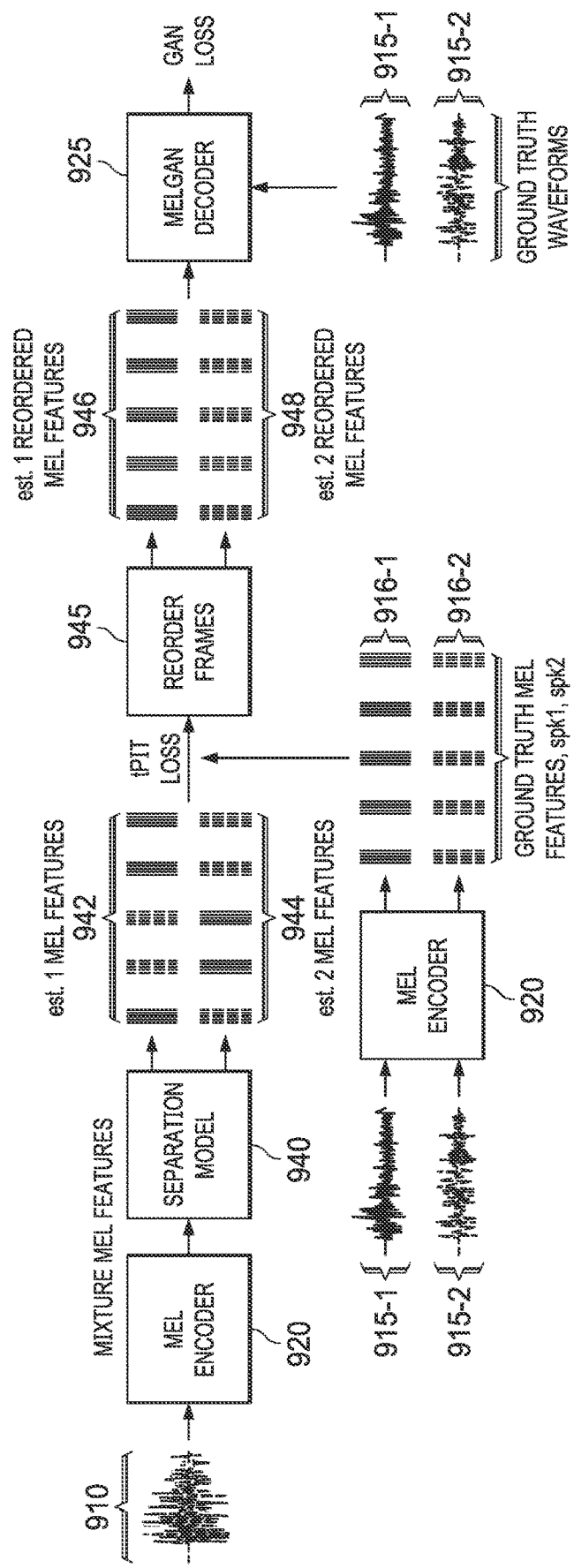
FIG. 9 is a schematic illustration of another example of training the separation stage of the deep-learning-based system for the third example of the waveform-based representation of audio signals according to an embodiment of the disclosure.

However, since the separated speech contains distortion, there will be a mismatch between the training data of the MelGAN and the output data from the separation model, if separately trained. Thus, alternatively, the MelGAN 925 and the tPIT model (i.e., the separation stage 940) may be jointly trained. FIG. 9 schematically illustrates a scheme for such joint training of the tPIT model 940 and the MelGAN 925. In this case, before sending frames of the separated Mel features 942, 944 into the MelGAN 925, these frames must be reordered 945 into respective output utterances 946, 948 based on the best tPIT permutation, so that the MelGAN inputs to the MelGAN 925 will have the same speaker order (speaker assignment) as the ground truth waveforms 915-1, 915-2. Thereby, the GAN loss can be correctly computed. The ground truth waveforms 915-1, 915-2 are also input to the MelGAN decoder 925 for training. The total loss of the joint training is given by:

$$\text{loss} = \text{tPIT} + \text{GAN\_loss} \quad (9)$$

The tPIT loss is determined based on the frames of the separated Mel features 942, 944 and frames of Mel features 916-1, 916-2 of the ground truth signal 915-1, 915-2 that are generated from the ground truth signals 915-1, 915-2 by the Mel encoder 920. It may be determined in analogy to Eq. (6) and (7), or Eq. (8), for example.

At the beginning of the joint training, there will be many permutation errors in the outputs 942, 944 of the separation model 940, which might cause difficulty for the MelGAN 925 to converge. To mitigate this problem, one could warm up the tPIT model 940 until it generates reasonably correct outputs, and only then start the joint training with the MelGAN 925.

Accordingly, a Mel decoder 925 corresponding to the Mel encoder 920 for generating the representation of the mixed audio signal, and the separation stage 940 may be jointly trained to minimize a joint loss function that comprises a contribution from the Mel transformation (e.g., contribution GAN_loss in Eq. (9)) and a contribution relating to the difference function (e.g., contribution tPIT in Eq. (9)). The Mel decoder 925 comprises or corresponds to a MelGAN.

In general, part of the present disclosure may be said to relate to combining tPIT with Generative Adversarial Networks (GANs) for speaker source separation.

It is also noted that, while the Mel/MelGAN framework is one of preferred implementations of the disclosure, any vocoder (either deep-learning-based or fixed) could be employed in the context of the present disclosure. Thus, example case (iii) is not to be construed to be limited to the Mel/MelGAN framework.

(iv) Deep learning-based problem agnostic speech encoder (PASE) and decoder. In this example formulation, the representation of the mixed audio signal relates to a PASE feature space representation generatable from the mixed audio signal by a deep-leaning-based PASE encoder. The Mel feature space is a hand-crafted speech feature space based on filterbanks. One can take advantage of more powerful features by using a deep learning-based speech encoder. PASE (see, e.g., Santiago Pascual et al., Learning problem-agnostic speech representations from multiple self-supervised tasks, https://arxiv.org/pdf/1904.03416.pdf) is a data-driven deep learning-based feature extractor. PASE features have the same advantage as Mel features, i.e., low time resolution. Differently from the Mel features, PASE provides a deep hierarchical abstraction of the underlying signal processing traits important for speaker separation, such as speaker ID, pitch, phoneme, etc. Therefore, computing PASE features may be more expressive than computing Mel features.

Figure 10:
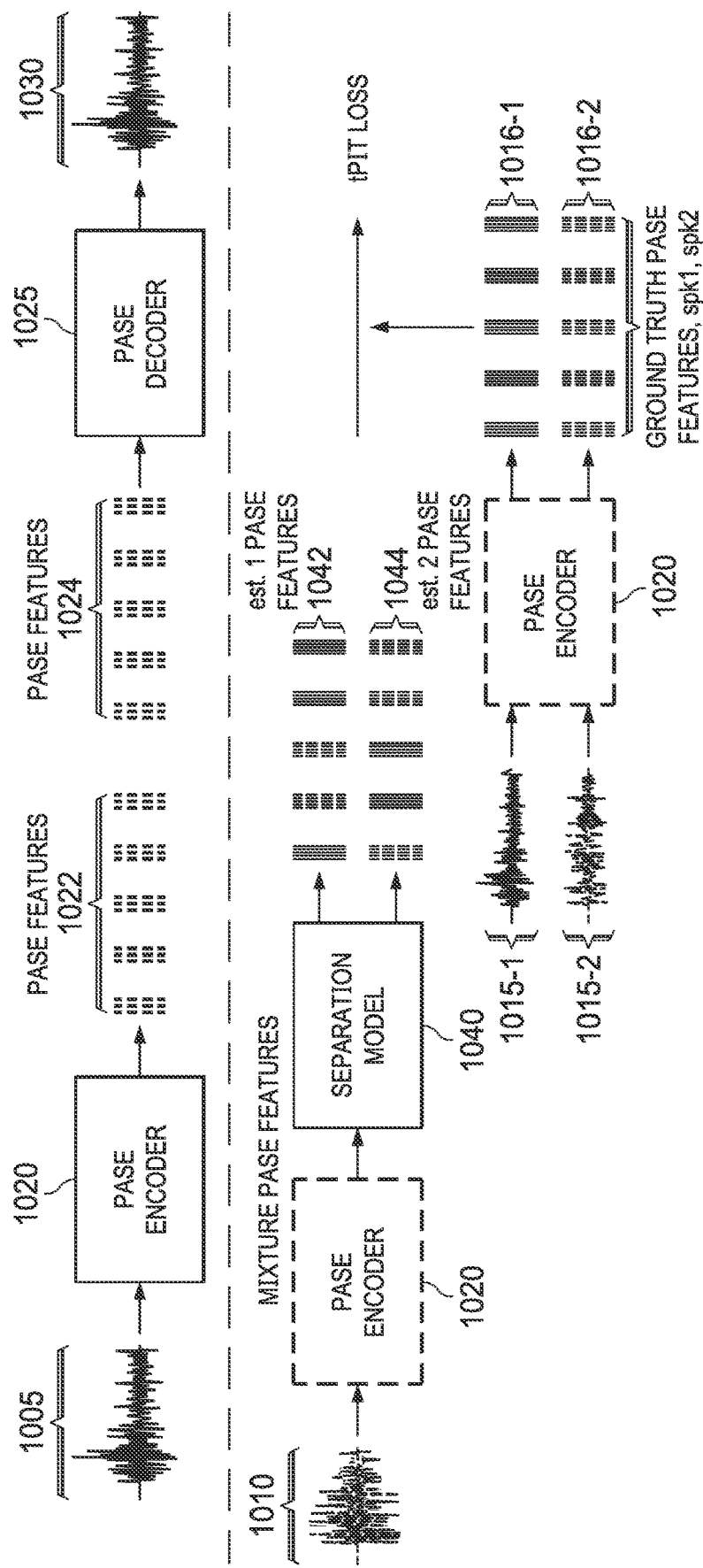
FIG. 10 is a schematic illustration of an example of training the separation stage of the deep-learning-based system for a fourth example of the waveform-based representation of audio signals according to an embodiment of the disclosure.

A high-level representation of the PASE encoder/decoder case is schematically illustrated in FIG. 10. The top panel shows the PASE encoder 1020 and the PASE decoder 1025. The PASE encoder 1020 transforms an input audio signal 1005 into a PASE feature space representation 1022 of the input audio signal 1005. Possibly after processing thereof, the PASE feature space representation 1024 is transformed back to an output waveform audio signal 1030 by the PASE decoder 1025.

The PASE encoder 1020 and PASE decoder 1025 may be pretrained first. Frames with a sparse vertical dashed lines pattern in FIG. 10 denote PASE features of the data used to train the PASE encoder 1020 and PASE decoder 1025, i.e., a PASE feature space representation 1022 of an input audio signal 1005. In the tPIT step shown in the bottom panel, i.e., in the training of the separation stage 1040, the PASE encoder 1020 is frozen (indicated by the dashed block) as a feature extractor. The separation stage 1040 is trained to minimize a loss function (tPIT loss) that is determined based on the frames of the separated PASE features 1042, 1044 and frames of PASE features 1016-1, 1016-2 of the ground truth signals 1015-1, 1015-2 that are generated from the ground truth signals 1015-1, 1015-2 by the (fixed) PASE encoder 1020. The tPIT loss may be determined in analogy to the tPIT loss for the Mel/MelGAN case described above, for example. That is, the tPIT loss may be determined in analogy to Eq. (6) and (7), or Eq. (8), for example. Frames with vertical solid lines and vertical dashed lines patterns in FIG. 10 correspond to separated frames, i.e., to frames of extracted representation of sound sources 1042, 1044.

The combined PASE and tPIT architecture according to this example formulation is similar to its Mel counterpart. In FIG. 10, the PASE encoder 1020 and PASE decoder 1025 are pretrained, and are set frozen in the subsequent tPIT stage. For details of the training, reference is made to Santiago Pascual et al. For the PASE decoder 1025, a similar architecture and training method could be used as for the Mel/MelGAN case. Hence, PASE features could be inverted into the waveform domain via a vocoder (e.g., in a similar way as a MelGAN does for Mel spectrograms).

Figure 11:
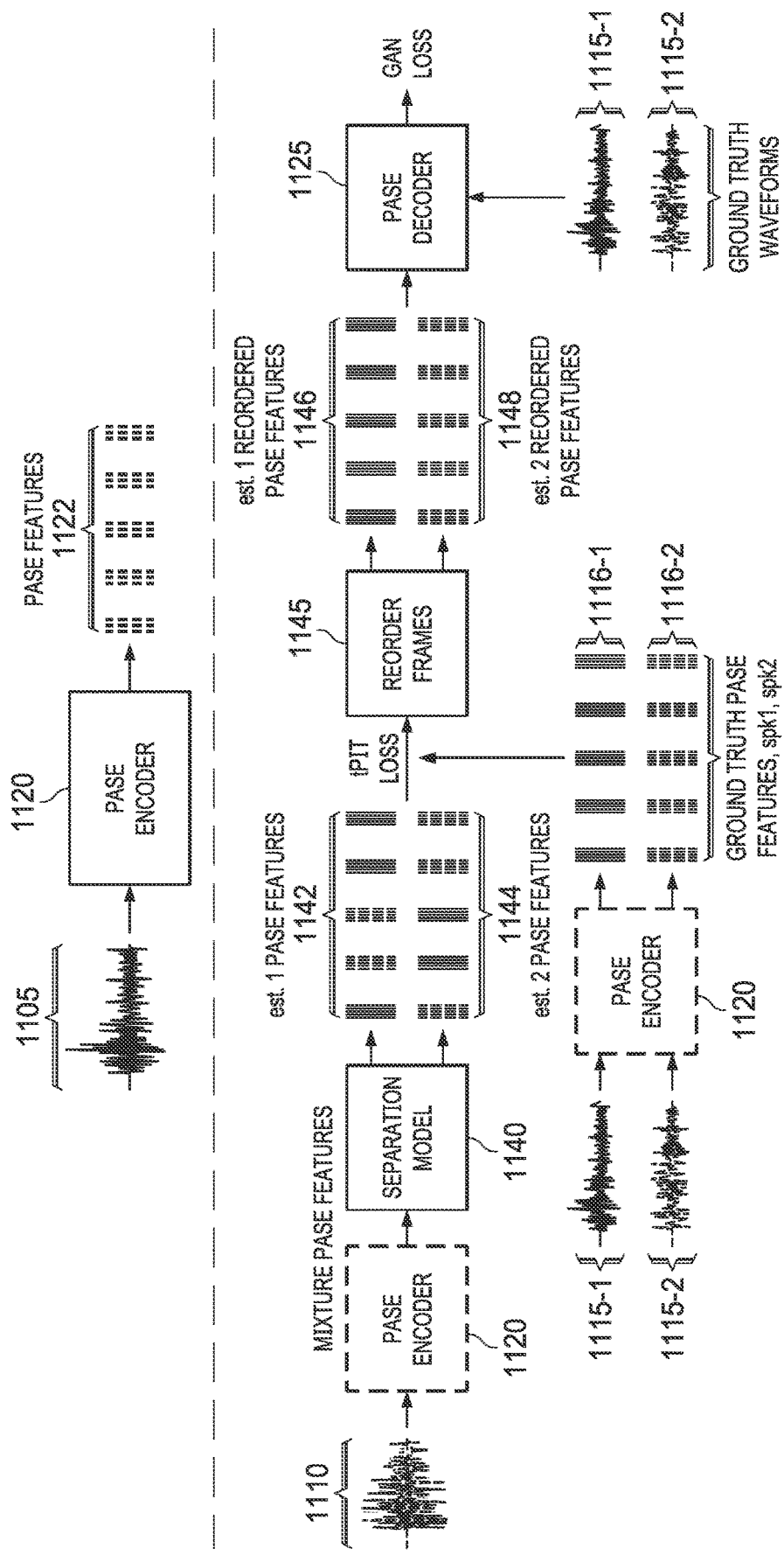
FIG. 11 is a schematic illustration of another example of training the separation stage of the deep-learning-based system for the fourth example of the waveform-based representation of audio signals according to an embodiment of the disclosure.

Alternatively, the PASE encoder could be pretrained in a first step. Subsequently, the source separation model (separation stage 1040) and the PASE decoder 1025 could be jointly trained in a subsequent step, i.e., the tPIT step. FIG. 11 schematically illustrates a scheme for such joint training of the tPIT separation stage 1140 and the PASE decoder 1125.

This time, only the PASE encoder 1120 is pretrained, as shown in the top panel of FIG. 11. Frames with a sparse vertical dashed lines pattern in FIG. 11 denote PASE features of the data used to train the PASE encoder 1120, i.e., a PASE feature space representation 1122 of an input audio signal 1105. In the tPIT step shown in the bottom panel, i.e., in the training of the separation stage 1140, the PASE encoder 1120 is frozen (indicated by the dashed block) as a feature extractor. The separation stage 1140 and the PASE decoder 1125 are jointly trained to minimize a loss function of the joint training. Before sending frames of the separated PASE features 1142, 114 into the PASE decoder 1125, these frames must be reordered 1145 into respective output utterances 1146, 1148 based on the best PIT permutation, so that the PASE decoder inputs to the PASE decoder 1125 will have the same speaker order (speaker assignment) as the ground truth waveforms 1115-1, 1115-2. The loss function for the tPIT step may be derived in analogy to Eq. (9). Its tPIT contribution may be determined, as above, based on the frames of the separated PASE features 1142, 1144 and frames of PASE features 1116-1, 1116-2 of the ground truth signals 1115-1, 1115-2 that are generated from the ground truth signals 1015-1, 1015-2 by the (fixed) PASE encoder 1120. The tPIT loss may again be determined in analogy to the tPIT loss for the Mel/MelGAN case described above, for example. Frames with vertical solid lines and vertical dashed lines patterns in FIG. 11 correspond to separated frames, i.e., to frames of extracted representation of sound sources 1142, 1144.

Accordingly, a PASE decoder 1125 corresponding to the PASE encoder 1120 for generating the representation of the mixed audio signal, and the separation stage 1140 are jointly trained to minimize a joint loss function that comprises a contribution from the PASE transformation (e.g., a contribution analogous to contribution GAN_loss in Eq. (9)) and a contribution relating to the difference function (e.g., a contribution analogous to contribution tPIT in Eq. (9)).

The separation model in all of the above-mentioned example formulations (i) through (iv) could use a wide range of existing network architectures, such as for example a Conv-TasNet architecture (see, e.g., Yi Luo et al., Conv-TasNet: Surpassing Ideal Time-Frequency Magnitude Masking for Speech Separation, https://arxiv.org/pdf/1809.07454.pdf), a DPRNN architecture (see, e.g., Yi Luo et al., Dual-path RNN: efficient long sequence modeling for time-domain single-channel speech separation, https://arxiv.org/pdf/1910.06379.pdf), a WaveNet architecture (see, e.g., Aaron van den Oord et al., WaveNet: a generative model for raw audio, https://arxiv.org/pdf/1609.03499.pdf), or a Demucs architecture (see, e.g., Alexandre Défossez et al., Music source separation in the waveform domain, https://hal.archives-ouvertes.fr/hal-02379796/document).

Figure 12:
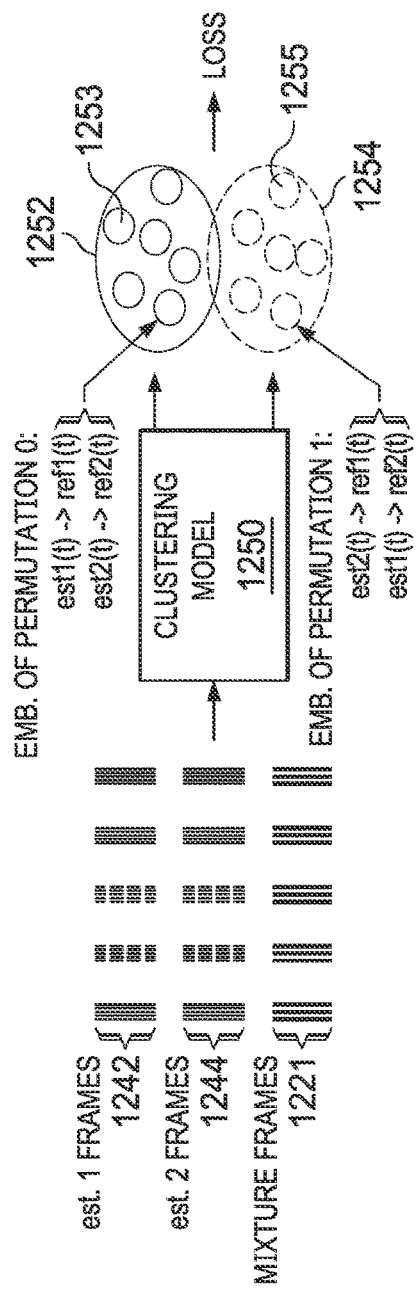
FIG. 12 is a schematic illustration of an example of training a clustering stage of the deep-learning-based system according to an embodiment of the disclosure.

Next, the clustering stage 450 of the deep-learning-based system for speech separation will be described with reference to FIG. 4 and FIG. 12. Notably, FIG. 12 is essentially identical to the bottom panel in FIG. 4.

Since tPIT is designed to locally separate sound sources or speakers, it fails to preserve sound source coherence along estimates. To preserve sound source coherence along estimates, a clustering model (implemented by the clustering stage 450, 1250) is trained to predict the best permutation over time. In general terms, the clustering stage 450, 1250 generates, for each frame of the mixed audio signal, a vector (embedding vector) indicative of an assignment permutation of extracted frames of representations of sound sources to respective sound sources. The assignment permutation may be indicative of a one-to-one assignment of extracted frames to (labels of) sound sources. As such, the clustering stage 450, 1250 maps the frames of the mixed audio signal to a lower-dimensional space, the so-called embedding space, depending on the assignment permutations that are chosen for the respective frames.

The outcome of the clustering by the clustering stage 450, 1250 may be used for resolving the sound source permutation ambiguity.

The clustering stage 450, 1250 is arranged to receive input from the separation stage 440, 1240. It takes the frames of extracted representations of audio sources 442, 444, 1242, 1244 (est1, est2) from the separation stage 440, 1240 as inputs. At training time, the clustering stage 450, 1250 further takes frames of the representation of the mixed audio signal 421, 1221 and indications of assignment permutations (permutation labels) that had been used for each frame in the tPIT step as inputs. Training the clustering stage 450, 1250 involves training a clustering model that generates, for each frame of the mixed input audio signal, an embedding vector 453, 455, 1253, 1255 that represents the permutation identity of each frame. Ideally, frames with the same permutation should have a small distance in the embedding space, whereas frames with different permutations should be far apart. That is, embedding vectors indicating the same permutation should be grouped together in respective groups or clusters 452, 454, 1252, 1254. To achieve this goal, a pairwise similarity loss could be used to train the clustering model 450, 1250, such as, for example $$\text{loss} = \|WW^T - VV^T\|^2 \qquad (10)$$

In Eq. (10), each row of W stores the embedding vector of a frame, and each row of V is a one-hot vector of the permutation label of that frame (e.g., either [0, 1] or [1, 0] in a two-speaker case), which is estimated by the tPIT after training the separation stage. The term $WW^T$ computes the cosine distances between the embedding vector of each frame and the embedding vectors of all frames. In general, the pairwise similarity loss may be based on (cosine) distances between embedding vector of each frame and the embedding vectors of all frames. Thus, the dimensions of W and V depend on the time resolution of the chosen representation of the mixed audio signal. If there are T frames in an utterance, the memory complexity of this loss is $O(T^2)$. At test time, the permutation labels are predicted by clustering the embedding vectors, and frames are reordered to form speaker-coherent utterances.

Accordingly, at training time, the representation of the mixed audio signal and, for each frame of the representation of the mixed audio signal, the frames of the extracted representations of the sound source together with an indication of the assignment permutation that had been chosen for the respective frame of the representation of the mixed audio signal are input to the clustering stage 450, 1250. With this input, the clustering stage 450, 1250 is trained to generate the aforementioned embedding vectors 453, 455, 1253, 1255 indicative of the assignment permutation of extracted frames of representations of sound sources to respective sound sources in such manner that a separation between groups 452, 454, 1252, 1254 of embedding vectors 453, 455, 1253, 1255 of the frames of the mixed audio signal is maximized. Therein, it is understood that the embedding vectors 453, 455, 1253, 1255 of the frames are grouped in accordance with the respective assignment permutations indicated by these embedding vectors, i.e., the known assignment permutations used by the tPIT. The separation (separation criterion) may be an implementation of loss function for training the clustering stage 1250. It may likewise be referred to as a similarity loss.

Further details of training the clustering stage 450, 1250 are described next. As noted above, the clustering stage 450, 1250 (or clustering model) takes the output frames from the tPIT stage (separation stage) as well as the mixture frames as input. The clustering stage further takes the known assignment permutations from the tPIT stage as input. Depending on which domain the tPIT stage works in, these frames could be waveform samples, optimized latent space features, Mel features, or PASE features, for example. Since the training of the separation stage is tPIT, the frames after separation are typically unordered, which means that the speaker identity (represented by the different patterning of the frames 1242, 1244 in FIG. 12) may change throughout the input stream.

However, the best permutation label estimated by the tPIT stage (separation) model at training time are known. These labels can now be used to train the clustering model to output an embedding vector for each frame. The training objective is designed so that the embeddings (embedding vectors) of frames that have the same permutation label within an utterance should be close to each other, and embeddings (embedding vectors) of frames of different permutations should be far away.

If the separation model (separation stage) works in the time domain or in the optimized latent space (example formulations (i) and (ii) described above), high time resolution is required to perform separation and phase modeling simultaneously in the tPIT stage, which yields a huge number of frames. In this case, the pairwise similarity loss of Eq. (10) may become prohibitively (memory) expensive at the time of training the clustering model. This issue can be addressed by using a reformulated version of the Generalized End to End (GE2E) loss (see, e.g., Li Wan et al., Generalized end-to-end loss for speaker verification, https://arxiv.org/pdf/1710.10467.pdf) to train the clustering model. To calculate the reformulated GE2E loss, for each frame of the (representation of the) mixed audio signal, the squared Euclidean distance between the frame's embedding vector and the mean embedding (centroid) of its own cluster, and also the distance between the frame's embedding vector and the mean embedding of other clusters is computed. In this sense, training the clustering stage to minimize the reformulated GE2E loss corresponds to optimizing a separation criterion for each frame of the (representation of the) mixed audio signal. In general, this separation criterion may be based on (squared) Euclidean distances between vectors (embedding vectors) and/or groups of vectors (embedding vectors).

Each cluster consists of embedding vectors of the same permutation label (assignment permutation). As noted above, at training time the permutation label estimated by the tPIT stage (separation stage) is known, and the known permutation labels can be used to define what frames belong to each cluster. In other words, the known permutation labels can be used to group the embedding vectors of the frames of the mixed audio signal into different clusters, one cluster per each permutation label. In other words, different clusters of embedding vectors are defined based on the permutation labels. The clustering stage is then trained to have the defined clusters sufficiently separated from each other.

In line with the above, training proceeds via maximizing the probability of an embedding vector to belong to its own cluster (i.e., via optimizing the aforementioned separation criterion). The probabilities are defined considering the underlying distances with respect to cluster centroids. For example, for the embedding vector $e_{ij}$ of the jth frame of the ith cluster (i.e., cluster with permutation label i), training the clustering stage may involve maximizing $$Prob(e_{ij} \in \text{cluster } i) = -d(e_{ij}, c_i) - \log \sum_{k=1}^{P} \exp(-d(e_{ij}, c_k)) \quad (11)$$

where P is the total number of permutations, $c_k$ is the mean (centroid) of the kth cluster, and d is the squared Euclidean distance. The squared Euclidean distance may be defined, for example, as $$d(x,y) = w\|x-y\|^2 + b \quad (12)$$

where w and b are optional parameters: scaling and offset. Parameters w and b may be learnable parameters, for example.

Thus, in general, the separation criterion may be based on, for a given frame of the (representation of the) mixed audio signal, (squared) Euclidean distances between a vector (embedding vector) indicating the assignment permutation for the frame and groups of vectors (embedding vectors) of other frames of the representation of the mixed audio signal. Therein, a distance between a vector and a group (cluster) of vectors may be defined as the distance between the vector and a centroid (mean) of the group. The centroid of a group of vectors may be the mean of the group. For example, the separation distance may be based on Euclidean distances or squared Euclidean distances between the vector for the frame and groups of (previously determined) vectors, wherein each group corresponds to one of the possible assignment permutations and comprises (only) all those vectors that indicate the respective assignment permutation. Optimizing the separation criterion may correspond to maximizing the probability of Eq. (11).

Notably, the present disclosure proposes to adapt or reformulate the GE2E loss for speech source separation. Contrary to what may be conventionally done, the present disclosure uses the squared Euclidean distance rather than the cosine distance for defining the loss. The Euclidean distance greatly improves performance and robustness. Moreover, contrary to how the GE2E loss may be conventionally used, $e_{ij}$ in Eq. (11) represents a "permutation embedding," as opposed to a "speaker embedding."

Using the separation criterion defined above can significantly reduce computational complexity. Specifically, when using the above separation criterion (instead of the similarity loss of Eq. (10)), it can be seen that for each frame only P distances, rather than T distances need to be calculated, where P is the total number of permutations (e.g., N! for N sound sources in the mixed audio signal) and T is the total temporal resolution of the signal. The value of P is usually comparatively small (such as two for a two-speaker case). Thus, the separation criterion (e.g., the reformulated GE2E loss) provides linear memory complexity O(T), which is crucial to make training feasible on a GPU.

On the other hand, if the input frames to the clustering model are Mel or PASE features (or other sets of vocoder features), these features already have comparatively low time resolution. Thus, in these case, either the pairwise loss (e.g., the similarity loss defined in Eq. (10)) or the proposed separation criterion (e.g., the modified GE2E loss defined in Eq. (11)) can be used to train the clustering model.

Hence, either by using the proposed separation criterion (e.g., modified GE2E loss), or using low-time-resolution features, the present disclosure contributes to reducing the computational complexity for waveform-based source separation models, trained with frame level permutation invariant training. This may be seen as an important step towards a faster and easier development of speech source separation models.

At separation time, when seeking to separate the speakers (or sound sources in general) from a given mixture (mixed audio signal), such mixture waveform first passes through the selected signal transform and then the separation model, to obtain the separated but unordered frames. Then, the clustering model generates a sequence of permutation embeddings (e.g., sequence of embedding vectors), with one permutation embedding per frame. Next, an unsupervised clustering method (e.g., K-means, Gaussian Mixture Model (GMM), Hidden Markov Model (HMM), etc.) is applied to the sequence of permutation embeddings, to segregate the permutation embeddings of the sequence into clusters (or groups), one cluster for each permutation. From this clustering, the permutation (assignment permutation) that had been used for each frame can be determined (e.g., predicted or estimated). Next, the extracted frames are reorganized according to the determined permutation labels, so that each output stream will contain only one speaker. Finally, the inverse transform converts each feature sequence back to a waveform.

Figure 13:
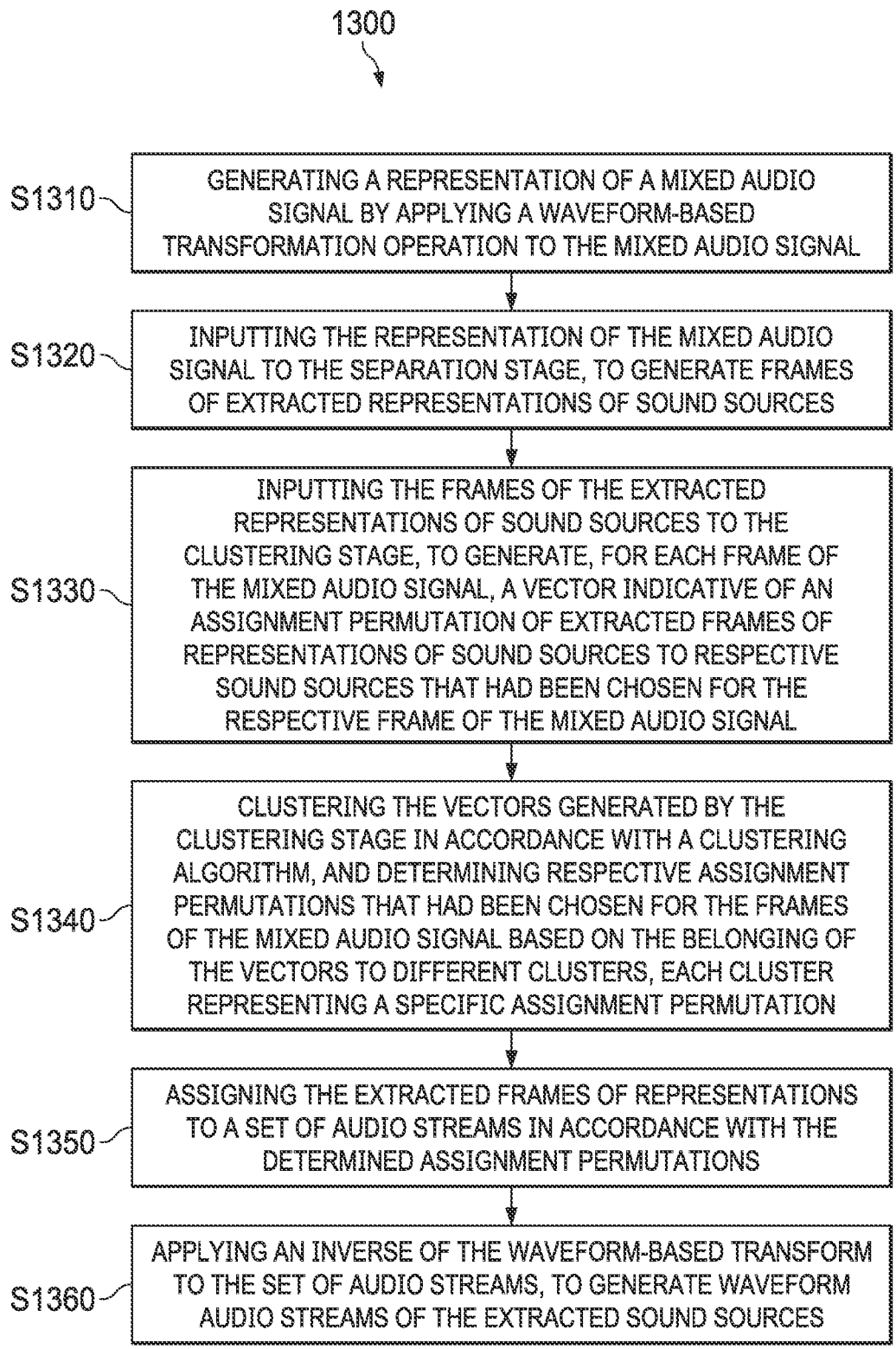
FIG. 13 is a flowchart illustrating an example of a proposed method of using the deep-learning-based system for sound source separation according to an embodiment of the disclosure.

A corresponding example of a method 1300 of using the above deep-learning-based system for sound source separation (e.g., speaker separation) will be described next with reference to the flowchart of FIG. 13. As described above, the system comprises a separation stage and a clustering stage. The separation stage performs frame-wise extraction of representations of sound sources from a representation of an audio signal. The clustering stage generates, for each frame, a vector (embedding vector) indicative of an assignment permutation of extracted frames of representations of sound sources to respective sound sources. Notably, the representations of audio signals are waveform-based representations.

Step S1310 of method 1300 is a step of generating a representation of a mixed audio signal by applying a waveform-based transformation operation to the mixed audio signal. The mixed audio signal includes at least two sound sources.

Step S1320 is a step of inputting the representation of the mixed audio signal to the separation stage, to generate frames of extracted representations of sound sources.

Step S1330 is a step of inputting the frames of the extracted representations of sound sources to the clustering stage, to generate, for each frame of the mixed audio signal, a vector indicative of an assignment permutation of extracted frames of representations of sound sources to respective sound sources that had been chosen for the respective frame of the mixed audio signal.

Step S1340 is a step of clustering the vectors generated by the clustering stage in accordance with a clustering algorithm, and determining (estimates or predictions of) respective assignment permutations that had been chosen for the frames of the mixed audio signal based on the belonging of the vectors to different clusters. Each cluster represents a specific assignment permutation.

Step S135 is a step of assigning the extracted frames of representations to a set of audio streams in accordance with the determined assignment permutations.

Finally, step S1360 is a step of applying an inverse of the waveform-based transform to the set of audio streams, to generate waveform audio streams of the extracted sound sources.

Example Computing Device

Figure 14:
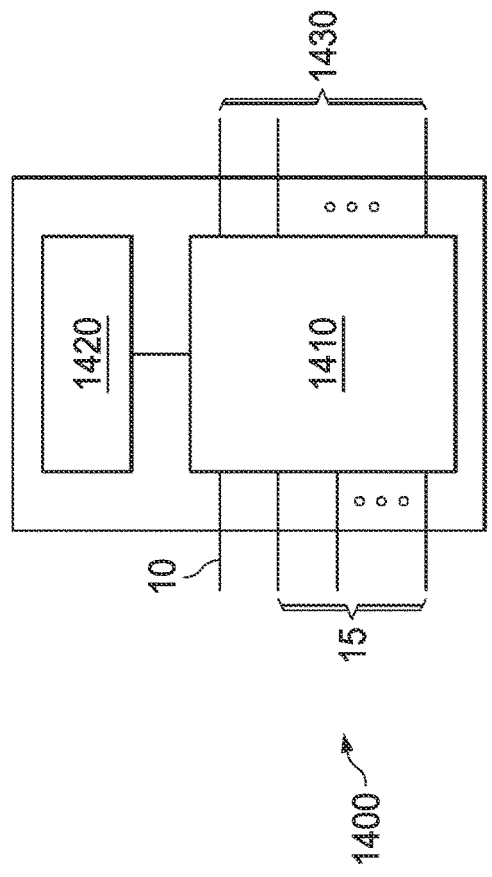
FIG. 14 is a schematic illustration of an example of an apparatus for carrying out methods according to embodiments of the disclosure.

A method of training a deep-learning-based system for sound source separation, as well as a method of using such system for sound source separation have been described. Additionally, the present disclosure also relates to an apparatus for carrying out these methods. An example of such apparatus 1400 is schematically illustrated in FIG. 14. The apparatus 1400 may comprise a processor 1410 (e.g., a central processing unit (CPU), a graphics processing unit (GPU), a digital signal processor (DSP), one or more application specific integrated circuits (ASICs), one or more radio-frequency integrated circuits (RFICs), or any combination of these) and a memory 1420 coupled to the processor 1410. The processor may be adapted to carry out some or all of the steps of the methods described throughout the disclosure. To carry out the method of training the deep-learning-based system, the apparatus 1400 may receive, as inputs, the mixed audio signal 10 and the reference audio signals 15, for example. In this case, the apparatus 1400 may output parameters 1430 (e.g., parameters of a deep neural net) for setting up the separation stage, the clustering stage, and/or the (inverse) transform stage. To carry out the method of performing actual source separation, the apparatus 1400 may receive the mixed audio signal 10 as input, for example. In this case, the apparatus 1400 may output audio signals of the separated sound sources (e.g., speakers).

The apparatus 1400 may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions (sequential or otherwise) that specify actions to be taken by that apparatus. Further, while only a single apparatus 1400 is illustrated in FIG. 14, the present disclosure shall relate to any collection of apparatus that individually or jointly execute instructions to perform any one or more of the methodologies discussed herein.

The present disclosure further relates to a program (e.g., computer program) comprising instructions that, when executed by a processor, cause the processor to carry out some or all of the steps of the methods described herein.

Yet further, the present disclosure relates to a computer-readable (or machine-readable) storage medium storing the aforementioned program. Here, the term "computer-readable storage medium" includes, but is not be limited to, data repositories in the form of solid-state memories, optical media, and magnetic media, for example.

Additional Configuration Considerations

Unless specifically stated otherwise, as apparent from the following discussions, it is appreciated that throughout the disclosure discussions utilizing terms such as "processing," "computing," "calculating," "determining", analyzing" or the like, refer to the action and/or processes of a computer or computing system, or similar electronic computing devices, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one example embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The processing system may also encompass a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one or more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code. Furthermore, a computer-readable carrier medium may form, or be included in a computer program product.

In alternative example embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a Personal Digital Assistant (PDA), a cellular telephone, a web appliance, a network router, switch or bridge, or any machine capable of executing a set of instructions (sequential or otherwise) that specify actions to be taken by that machine.

Note that the term "machine" shall also be taken to include any collection of machines that individually or jointly execute a set (or multiple sets) of instructions to perform any one or more of the methodologies discussed herein.

Thus, one example embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, example embodiments of the present disclosure may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present disclosure may take the form of a method, an entirely hardware example embodiment, an entirely software example embodiment or an example embodiment combining software and hardware aspects. Furthermore, the present disclosure may take the form of carrier medium (e.g., a computer program product on a computer-readable storage medium) carrying computer-readable program code embodied in the medium.

The software may further be transmitted or received over a network via a network interface device. While the carrier medium is in an example embodiment a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present disclosure. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media may also take the form of acoustic or light waves, such as those generated during radio wave and infrared data communications. For example, the term "carrier medium" shall accordingly be taken to include, but not be limited to, solid-state memories, a computer product embodied in optical and magnetic media; a medium bearing a propagated signal detectable by at least one processor or one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one example embodiment by an appropriate processor (or processors) of a processing (e.g., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Reference throughout this disclosure to "one example embodiment", "some example embodiments" or "an example embodiment" means that a particular feature, structure or characteristic described in connection with the example embodiment is included in at least one example embodiment of the present disclosure. Thus, appearances of the phrases "in one example embodiment", "in some example embodiments" or "in an example embodiment" in various places throughout this disclosure are not necessarily all referring to the same example embodiment. Furthermore, the particular features, structures or characteristics may be combined in any suitable manner, as would be apparent to one of ordinary skill in the art from this disclosure, in one or more example embodiments.

As used herein, unless otherwise specified the use of the ordinal adjectives "first", "second", "third", etc., to describe a common object, merely indicate that different instances of like objects are being referred to and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of example embodiments of the disclosure, various features of the disclosure are sometimes grouped together in a single example embodiment, Fig., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed example embodiment. Thus, the claims following the Description are hereby expressly incorporated into this Description, with each claim standing on its own as a separate example embodiment of this disclosure.

Furthermore, while some example embodiments described herein include some but not other features included in other example embodiments, combinations of features of different example embodiments are meant to be within the scope of the disclosure, and form different example embodiments, as would be understood by those skilled in the art. For example, in the following claims, any of the claimed example embodiments can be used in any combination.

In the description provided herein, numerous specific details are set forth. However, it is understood that example embodiments of the disclosure may be practiced without these specific details. In other instances, well-known methods, structures and techniques have not been shown in detail in order not to obscure an understanding of this description.

Thus, while there has been described what are believed to be the best modes of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

Various aspects of the present invention may be appreciated from the following enumerated example embodiments (EEEs):

EEE 1. A method of training a deep-learning-based system for sound source separation, wherein the system comprises a separation stage for frame-wise extraction of representations of sound sources from a representation of an audio signal, and a clustering stage for generating, for each frame, an estimate of an assignment permutation, among possible assignment permutations, of extracted frames of representations of sound sources to respective sound sources, wherein the representation of the audio signal is a waveform-based representation, the method comprising:

obtaining, as inputs, a representation of a mixed audio signal and representations of at least two reference audio signals, wherein the representations are waveform-based representations, wherein the mixed audio signal includes at least two sound sources, and wherein the reference audio signals correspond to respective ones of the sound sources included in the mixed audio signal; and inputting the representation of the mixed audio signal and the representations of the at least two reference audio signals to the separation stage, and training the separation stage to extract the representations of the sound sources from the representation of the mixed audio signal in such manner that, for each frame of the representation of the mixed audio signal, a difference function is minimized, wherein the difference function is based on differences between frames of extracted representations of sound sources and frames of representations of reference audio signals, wherein pairs of frames of extracted representations of sound sources and frames of representations of the reference audio signals are chosen, for taking the differences, based on one of the possible assignment permutations, and wherein for each frame such assignment permutation of extracted representations of sound sources and representations of reference audio signals is chosen, for calculating the difference function, that results in the smallest difference function.

EEE 2. The method of EEE 1, wherein the clustering stage generates, for each frame, a vector indicative of the estimate of the respective assignment permutation; and wherein the method further comprises:

inputting the representation of the mixed audio signal and, for each frame of the representation of the mixed audio signal, the frames of the extracted representations of the sound source together with an indication of the assignment permutation that had been chosen for the respective frame of the representation of the mixed audio signal to the clustering stage, and training the clustering stage to generate the vectors indicative of the assignment permutation of extracted frames of representations of sound sources to respective sound sources in such manner that a separation between groups of vectors of the frames of the mixed audio signal is maximized, wherein the vectors of the frames are grouped in accordance with the respective assignment permutations indicated by these vectors.

EEE 3. The method according to EEE 1 or 2, wherein the difference function is indicative of a combination of differences between frames of extracted representations of sound sources and frames of representations of reference audio signals, wherein the combination of differences includes, for each extracted representation of a sound source, a difference between the frame of the extracted representation of the sound source and a respective frame of a representation of a reference audio signal.

EEE 4. The method according to EEE 2 or EEE 3 when depending on EEE 2,
wherein the clustering stage is trained so that a separation criterion is optimized for each frame of the representation of the mixed audio signal; and
wherein the separation criterion is based on Euclidean distances between vectors and/or groups of vectors.

EEE 5. The method according to EEE 2 or any one of EEEs 3 or 4 when depending on EEE 2,
wherein the clustering stage is trained so that a separation criterion is optimized for each frame of the representation of the mixed audio signal; and
wherein the separation criterion is based on, for a given frame of the representation of the mixed audio signal, Euclidean distances between a vector indicating the assignment permutation for the frame and groups of vectors of other frames of the representation of the mixed audio signal.

EEE 6. The method according to EEE 4 or 5, wherein optimizing the separation criterion corresponds to maximizing, for a given frame of the representation of the mixed audio signal, $$Prob(e_i \in \text{group } i) = -d(e_i, c_i) - \log \sum_{k=1}^{P} \exp(-d(e_i, c_k))$$

where $e_i$ is the vector of the given frame, $c_k$ is the centroid of the group of vectors for the k-th assignment permutation, P is the total number of assignment permutations, and $d(\cdot,\cdot)$ is the squared Euclidean distance.

EEE 7. The method according to any one of the preceding EEEs,
wherein the system further comprises a transform stage for transforming the mixed audio signal to the representation of the mixed audio signal; and
wherein the mixed audio signal is transformed to a signal space that is a waveform-based signal space.

EEE 8. The method according to any one of EEEs 1 to 6,
wherein the system further comprises a transform stage for transforming the mixed audio signal to the representation of the mixed audio signal; and
wherein the transforming involves at least one of:
segmenting the mixed audio signal into a plurality of frames in the time domain;
deep-learning-based encoding for projecting the mixed audio signal into a latent feature space optimized for sound source separation;
Mel-space encoding; and
deep-learning-based problem agnostic speech encoding.

EEE 9. The method according to any one of the preceding EEEs,
wherein the representation of the mixed audio signal relates to a segmentation of the mixed audio signal into waveform frames;
wherein the separation stage is trained to determine, for each frame of the mixed audio signal, frames of extracted sound sources from the frame of the mixed audio signal in such manner that a loss function $$\sum_{n=1}^{N}\sum_{l=1}^{L} \left| est_n(t, l) - ref_{\Pi_k(n)}(t, l) \right|$$

is minimized, wherein t indicates the frame, l denotes the sample number within the frame, L is the total number of samples within the frame, n indicates the label of the extracted sound source, N is the total number of extracted sound sources, est denotes a frame of an extracted sound source, ref denotes a frame of a reference audio signal, and $\Pi_k(n)$ is a permutation mapping for labels n=1, . . . , N and indicates the label of the reference audio signal; and wherein, for each frame, that permutation mapping $\Pi_k$ is chosen that yields the smallest loss function.

EEE 10. The method according to any one of EEEs 1 to 8,
wherein the representation of the mixed audio signal relates to a latent feature space representation of the mixed audio signal generatable by a pre-trained deep-learning-based encoder;
wherein the separation stage is trained to determine, for each frame of the mixed audio signal, frames of extracted sound sources from the frame of the mixed audio signal in such manner that a loss function $$\sum_{n=1}^{N}\sum_{f} \left| \hat{V}_n(t, f) - V_{\Pi_k(n)}(t, f) \right|$$

is minimized, wherein t indicates the frame, f denotes the feature within the latent feature space, n indicates the label of the extracted sound source and reference audio signal, N is the total number of extracted sound sources, $\hat{V}$ denotes a frame of a representation of the extracted sound source, V denotes a frame of a representation of the reference audio signal, and $\Pi_k(n)$ is a permutation mapping for labels n=1, . . . , N and indicates the label of the reference audio signal; and wherein, for each frame, that permutation mapping $\Pi_k$ is chosen that yields the smallest loss function.

EEE 11. The method according to any one of EEEs 1 to 8, wherein the representation of the mixed audio signal relates to a Mel feature space representation generatable from the mixed audio signal by a Mel encoder; and wherein a corresponding Mel decoder and the separation stage are jointly trained to minimize a joint loss function that comprises a contribution from the Mel transformation and a contribution relating to the difference function.

EEE 12. The method according to any one of EEEs 1 to 8, wherein the representation of the mixed audio signal relates to a Problem Agnostic Speech Encoder, PASE, feature space representation generatable from the mixed audio signal by a deep-learning-based PASE encoder; and wherein a PASE decoder corresponding to the PASE encoder and the separation stage are jointly trained to minimize a joint loss function that comprises a contribution from the PASE transformation and a contribution relating to the difference function.

EEE 13. The method according to any one of the preceding EEEs, wherein the sound sources relate to speech sources.

EEE 14. The method according to any one of the preceding EEEs, wherein the separation stage of the system is based on one of:
a Conv-TasNet architecture;
a DPRNN architecture;
a WaveNet architecture; and
a Demucs architecture.

EEE 15. A method of sound source separation using a deep-learning-based system, wherein the system comprises a separation stage for frame-wise extraction of representations of sound sources from a representation of an audio signal, and a clustering stage for generating, for each frame, a vector indicative of an assignment permutation of extracted frames of representations of sound sources to respective sound sources, wherein the representation of the audio signal is a waveform-based representation, the method comprising:

generating a representation of a mixed audio signal by applying a waveform-based transformation operation to the mixed audio signal, wherein the representation is a waveform-based representation, and wherein the mixed audio signal includes at least two sound sources;

inputting the representation of the mixed audio signal to the separation stage, to generate frames of extracted representations of sound sources;

inputting the frames of the extracted representations of sound sources to the clustering stage, to generate, for each frame of the mixed audio signal, a vector indicative of an assignment permutation of extracted frames of representations of sound sources to respective sound sources that had been chosen for the respective frame of the mixed audio signal;

clustering the vectors generated by the clustering stage in accordance with a clustering algorithm, and determining respective assignment permutations that had been chosen for the frames of the mixed audio signal based on the belonging of the vectors to different clusters, each cluster representing a specific assignment permutation;

assigning the extracted frames of representations to a set of audio streams in accordance with the determined assignment permutations; and applying an inverse of the waveform-based transform to the set of audio streams, to generate waveform audio streams of the extracted sound sources.

EEE 16. A program comprising instructions that, when executed by a processor, cause the processor to carry out all steps of the method according to any one of the preceding EEEs.

EEE 17. A computer-readable storage medium storing the program according to EEE 16.

EEE 18. An apparatus comprising a processor and a memory coupled to the processor, wherein the processor is adapted to carry out all steps of the method according to any one of EEEs 1 to 15.

The invention claimed is:

1. A computer-implemented method of training a deep-learning-based system for sound source separation, wherein the system comprises a deep-learning based separation stage for frame-wise extraction of representations of sound sources from a representation of an audio signal, and a clustering stage for generating, for each frame, an estimate of an assignment permutation, among possible assignment permutations, of extracted frames of representations of sound sources to respective sound sources, wherein the representation of the audio signal is a waveform-based representation and wherein the waveform-based representation is a time-domain representation or a transform of the time-domain representation other than a time-frequency transform, suitable for waveform-based models, the method comprising:

obtaining, as inputs, a representation of a mixed audio signal and representations of at least two reference audio signals, wherein the representations are waveform-based representations and wherein the waveform-based representations are time-domain representations or transforms of the time-domain representations other than time-frequency transforms, suitable for waveform-based models, wherein the mixed audio signal includes at least two sound sources, and wherein the reference audio signals correspond to respective ones of the sound sources included in the mixed audio signal; and inputting the representation of the mixed audio signal and the representations of the at least two reference audio signals to the separation stage, and training the separation stage to extract the representations of the sound sources from the representation of the mixed audio signal in such manner that, for each frame of the representation of the mixed audio signal, a difference function is minimized, wherein the difference function is based on differences between frames of extracted representations of sound sources and frames of representations of reference audio signals, wherein pairs of frames of extracted representations of sound sources and frames of representations of the reference audio signals are chosen, for taking the differences, based on one of the possible assignment permutations, and wherein for each frame such assignment permutation of extracted representations of sound sources and representations of reference audio signals is chosen, for calculating the difference function, that results in the smallest difference function, wherein the clustering stage generates, for each frame, a vector indicative of the estimate of the respective assignment permutation; and wherein the method further comprises:

inputting the representation of the mixed audio signal and, for each frame of the representation of the mixed audio signal, the frames of the extracted representations of the sound source together with an indication of the assignment permutation that had been chosen for the respective frame of the representation of the mixed audio signal to the clustering stage, and training the clustering stage to generate the vectors indicative of the assignment permutation of extracted frames of representations of sound sources to respective sound sources in such manner that a separation between groups of vectors of the frames of the mixed audio signal is maximized, wherein the vectors of the frames are grouped in accordance with the respective assignment permutations indicated by these vectors, wherein the clustering stage is trained so that a separation criterion is optimized for each frame of the representation of the mixed audio signal; and wherein the separation criterion is based on Euclidean distances between vectors and/or groups of vectors.

2. The method according to claim 1, wherein the difference function is indicative of a combination of differences between frames of extracted representations of sound sources and frames of representations of reference audio signals, wherein the combination of differences includes, for each extracted representation of a sound source, a difference between the frame of the extracted representation of the sound source and a respective frame of a representation of a reference audio signal.

3. The method according to claim 1, wherein the separation criterion is based on, for a given frame of the representation of the mixed audio signal, Euclidean distances between a vector indicating the assignment permutation for the frame and groups of vectors of other frames of the representation of the mixed audio signal.

4. The method according to claim 1, wherein optimizing the separation criterion corresponds to maximizing, for a given frame of the representation of the mixed audio signal, $$Prob(e_i \in \text{group } i) = -d(e_i, c_i) - \log \sum_{k=1}^{P} \exp(-d(e_i, c_k))$$

where $e_i$ is the vector of the given frame, $c_k$ is the centroid of the group of vectors for the k-th assignment permutation, P is the total number of assignment permutations, and d (•, •) is the squared Euclidean distance.

5. The method according to claim 1, wherein the system further comprises a transform stage for transforming the mixed audio signal to the representation of the mixed audio signal; and wherein the mixed audio signal is transformed to a signal space that is a waveform-based signal space other than the frequency domain.

6. The method according to claim 1, wherein the system further comprises a transform stage for transforming the mixed audio signal to the representation of the mixed audio signal; and wherein the transforming involves at least one of:

segmenting the mixed audio signal into a plurality of frames in the time domain;

deep-learning-based encoding for projecting the mixed audio signal into a latent feature space optimized for sound source separation;

Mel-space encoding; and deep-learning-based problem agnostic speech encoding.

7. The method according to claim 1, wherein the representation of the mixed audio signal relates to a segmentation of the mixed audio signal into waveform frames;

wherein the separation stage is trained to determine, for each frame of the mixed audio signal, frames of extracted sound sources from the frame of the mixed audio signal in such manner that a loss function $$\sum_{n=1}^{N}\sum_{l=1}^{L}|est_n(t, l) - ref_{\Pi_k(n)}(t, l)|$$

is minimized, wherein t indicates the frame, l denotes the sample number within the frame, $\Pi_k$ (n) is the total number of samples within the frame, n indicates the label of the extracted sound source, N is the total number of extracted sound sources, est denotes a frame of an extracted sound source, ref denotes a frame of a reference audio signal, and $\Pi_k$ (n) is a permutation mapping for labels n=1, . . . , N and indicates the label of the reference audio signal; and wherein, for each frame, that permutation mapping $\Pi_k$ is chosen that yields the smallest loss function.

8. The method according to claim 1, wherein the representation of the mixed audio signal relates to a latent feature space representation of the mixed audio signal generatable by a pre-trained deep-learning-based encoder;

wherein the separation stage is trained to determine, for each frame of the mixed audio signal, frames of extracted sound sources from the frame of the mixed audio signal in such manner that a loss function $$\sum_{n=1}^{N}\sum_{f}|\hat{V}_n(t, f) - V_{\Pi_k(n)}(t, f)|$$

is minimized, wherein t indicates the frame, f denotes the feature within the latent feature space, n indicates the label of the extracted sound source and reference audio signal, N is the total number of extracted sound sources, $\hat{V}$ denotes a frame of a representation of the extracted sound source, V denotes a frame of a representation of the reference audio signal, and $\Pi_k$ (n) is a permutation mapping for labels n=1, . . . , N and indicates the label of the reference audio signal; and wherein, for each frame, that permutation mapping $\Pi_k$ is chosen that yields the smallest loss function.

9. The method according to claim 1, wherein the representation of the mixed audio signal relates to a Mel feature space representation generatable from the mixed audio signal by a Mel encoder; and wherein a corresponding Mel decoder and the separation stage are jointly trained to minimize a joint loss function that comprises a contribution from the Mel transformation and a contribution relating to the difference function.

10. The method according to claim 1,
wherein the representation of the mixed audio signal relates to a Problem Agnostic Speech Encoder, PASE, feature space representation generatable from the mixed audio signal by a deep-learning-based PASE encoder; and
wherein a PASE decoder corresponding to the PASE encoder and the separation stage are jointly trained to minimize a joint loss function that comprises a contribution from the PASE transformation and a contribution relating to the difference function.

11. The method according to claim 1, wherein the sound sources relate to speech sources.

12. The method according to claim 1, wherein the separation stage of the system is based on one of:
a Conv-TasNet architecture;
a DPRNN architecture;
a WaveNet architecture; and
a Demucs architecture.

13. A non-transitory computer-readable storage medium comprising executable instructions that, when executed by an electronic processor, causes the electronic processor to perform the method of claim 1.

14. An apparatus comprising a processor and a memory coupled to the processor, wherein the processor is adapted to carry out all steps of the method according to claim 1.

15. A computer-implemented method of sound source separation using a deep-learning-based system,
wherein the system comprises a deep-learning based separation stage for frame-wise extraction of representations of sound sources from a representation of an audio signal, and a clustering stage for generating, for each frame, a vector indicative of an assignment permutation of extracted frames of representations of sound sources to respective sound sources, wherein the representation of the audio signal is a waveform-based representation and wherein the waveform-based representation is a time-domain representation or a transform of the time-domain representation other than a time-frequency transform, suitable for waveform-based models, the method comprising:
generating a representation of a mixed audio signal by applying a waveform-based transformation operation to the mixed audio signal, wherein the representation is a waveform-based representation and wherein the waveform-based representation is a time-domain representation and the waveform-based transformation is a transform other than a time-frequency transform, suitable for waveform-based models, and wherein the mixed audio signal includes at least two sound sources;
inputting the representation of the mixed audio signal to the separation stage, to generate frames of extracted representations of sound sources;
inputting the frames of the extracted representations of sound sources to the clustering stage, to generate, for each frame of the mixed audio signal, a vector indicative of an assignment permutation of extracted frames of representations of sound sources to respective sound sources that had been chosen for the respective frame of the mixed audio signal;
clustering the vectors generated by the clustering stage in accordance with a clustering algorithm, and determining respective assignment permutations that had been chosen for the frames of the mixed audio signal based on the belonging of the vectors to different clusters, each cluster representing a specific assignment permutation;
assigning the extracted frames of representations to a set of audio streams in accordance with the determined assignment permutations; and
applying an inverse of the waveform-based transform to the set of audio streams, to generate waveform audio streams of the extracted sound sources.

* * * * *